(12) United States Patent
Bar

(10) Patent No.: US 10,994,400 B2
(45) Date of Patent: May 4, 2021

(54) MULTI-PURPOSE TOOL

(71) Applicant: C. B. Innovation Ltd., Nofit (IL)

(72) Inventor: Yaniv Bar, Nofit (IL)

(73) Assignee: C. B. INNOVATION LTD., Maayan Tzvi (IL)

( * ) Notice: Subject to any disclaimer, the term of this patent is extended or adjusted under 35 U.S.C. 154(b) by 200 days.

(21) Appl. No.: 15/572,787

(22) PCT Filed: Jun. 13, 2016

(86) PCT No.: PCT/IB2016/053462
§ 371 (c)(1),
(2) Date: Nov. 9, 2017

(87) PCT Pub. No.: WO2016/203355
PCT Pub. Date: Dec. 22, 2016

(65) Prior Publication Data
US 2018/0117753 A1    May 3, 2018

Related U.S. Application Data

(60) Provisional application No. 62/295,148, filed on Feb. 15, 2016.

(30) Foreign Application Priority Data

Jun. 15, 2015   (IL) .......................................... 239432

(51) Int. Cl.
*B25F 1/04* (2006.01)
*B25F 1/00* (2006.01)
(Continued)

(52) U.S. Cl.
CPC ................ *B25F 1/04* (2013.01); *A01B 1/022* (2013.01); *A62B 3/005* (2013.01); *B23D 51/01* (2013.01);
(Continued)

(58) Field of Classification Search
CPC ......... B26B 1/04; B26B 11/00; B26B 11/008; B26B 23/00; B26B 3/00; B26B 3/06;
(Continued)

(56) References Cited

U.S. PATENT DOCUMENTS 1,757,029 A * 5/1930 Vivenoy .................. A01B 1/20
                                                            7/116
4,287,623 A * 9/1981 Tarran .................... B23D 29/02
                                                            7/158
(Continued)

FOREIGN PATENT DOCUMENTS

DE     20 2004 018599        4/2005

OTHER PUBLICATIONS

English Abstract and Bibliographic Data for DE202004018599, printed from Espacenet.com on May 14, 2019.
(Continued)

*Primary Examiner* — David B. Thomas
(74) *Attorney, Agent, or Firm* — Eitan Mehulal Sadot

(57) ABSTRACT

A multi-purpose tool or apparatus includes multiple mechanical tools. In one implementation, the multi-purpose tool includes an elongated handle, a folding axe, and a folding shovel or spade, as well as a hammer or hammerhead. The folding axe is foldable between an open position and a closed position. The folding shovel is foldable among three positions, which are a closed shovel position, a 90-degree open shovel position, and a 180-degree extended shovel position. The elongated handle is hollow and includes an elongated cavity. A folding saw, as well as a knife and a sheath to protect the knife, are stored within the elongated cavity and can be removed therefrom.

15 Claims, 32 Drawing Sheets

(51) Int. Cl.
  *B25G 1/08* (2006.01)
  *B26B 11/00* (2006.01)
  *B26B 23/00* (2006.01)
  *B26B 29/02* (2006.01)
  *A62B 3/00* (2006.01)
  *A01B 1/02* (2006.01)
  *B23D 51/01* (2006.01)
  *B26B 3/06* (2006.01)
  *B26B 3/00* (2006.01)

(52) U.S. Cl.
  CPC ............... *B25F 1/006* (2013.01); *B25G 1/08* (2013.01); *B26B 3/06* (2013.01); *B26B 11/00* (2013.01); *B26B 23/00* (2013.01); *B26B 29/025* (2013.01); *B26B 3/00* (2013.01)

(58) Field of Classification Search
  CPC .......... B26B 29/025; B25F 1/006; B25F 1/04; A01B 1/022; A01B 1/20; B25G 1/08
  See application file for complete search history.

(56) References Cited

U.S. PATENT DOCUMENTS

| | | | |
|---|---|---|---|
| 4,700,420 A | 10/1987 | Belanger | |
| 4,846,042 A | 7/1989 | Wetty | |
| 5,103,520 A | 4/1992 | Mazzo | |
| 5,771,588 A | 6/1998 | Petrich | |
| 6,363,561 B1 | 4/2002 | Chang | |
| 6,928,899 B1* | 8/2005 | Lin | B25D 1/045 81/20 |
| 6,948,208 B1 | 9/2005 | Schlenner | |
| 7,036,952 B2 | 5/2006 | Zirk | |
| 8,033,199 B1* | 10/2011 | Noble | B25G 1/08 81/23 |
| 8,424,845 B2* | 4/2013 | Cole | B25C 11/00 254/26 R |
| 9,119,337 B2* | 9/2015 | Frati | A01B 1/225 |
| 9,289,650 B2* | 3/2016 | Willey | B25D 7/00 |
| 9,707,676 B2* | 7/2017 | Chapman | B25H 3/006 |
| 10,124,478 B2* | 11/2018 | Nicholls | B25F 1/04 |
| 2002/0178875 A1 | 12/2002 | Lin | |
| 2002/0184713 A1 | 12/2002 | Dallas | |
| 2005/0015885 A1 | 1/2005 | Johnson | |
| 2005/0097929 A1 | 5/2005 | Anderson | |
| 2005/0102845 A1* | 5/2005 | Dallas | B26B 11/00 30/308.1 |
| 2010/0207081 A1* | 8/2010 | Liou | B25F 1/006 254/129 |
| 2015/0165629 A1* | 6/2015 | Johnson | B26B 11/00 7/160 |
| 2017/0274519 A1* | 9/2017 | Chapman | B25F 1/006 |

OTHER PUBLICATIONS

Extended European Search Report (EESR) in European patent application EP 16811108; dated Feb. 4, 2019.
International Search Report for application PCT/IB2016/053462 dated Sep. 29, 2016.
Written Opinion of the International Search Authority for application PCT/IB2016/053462 dated Sep. 29, 2016.

* cited by examiner

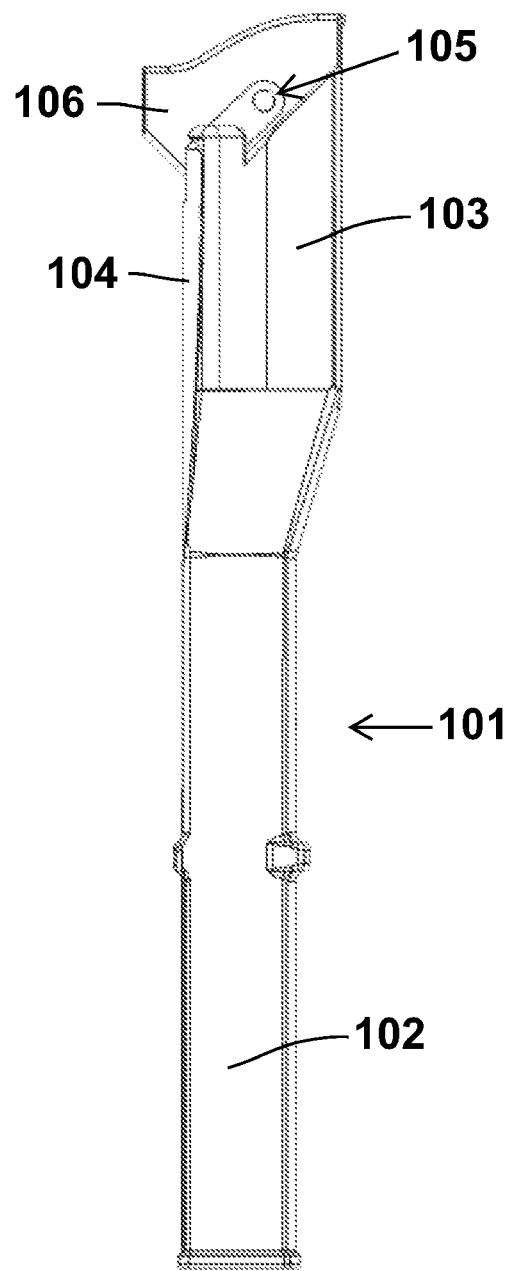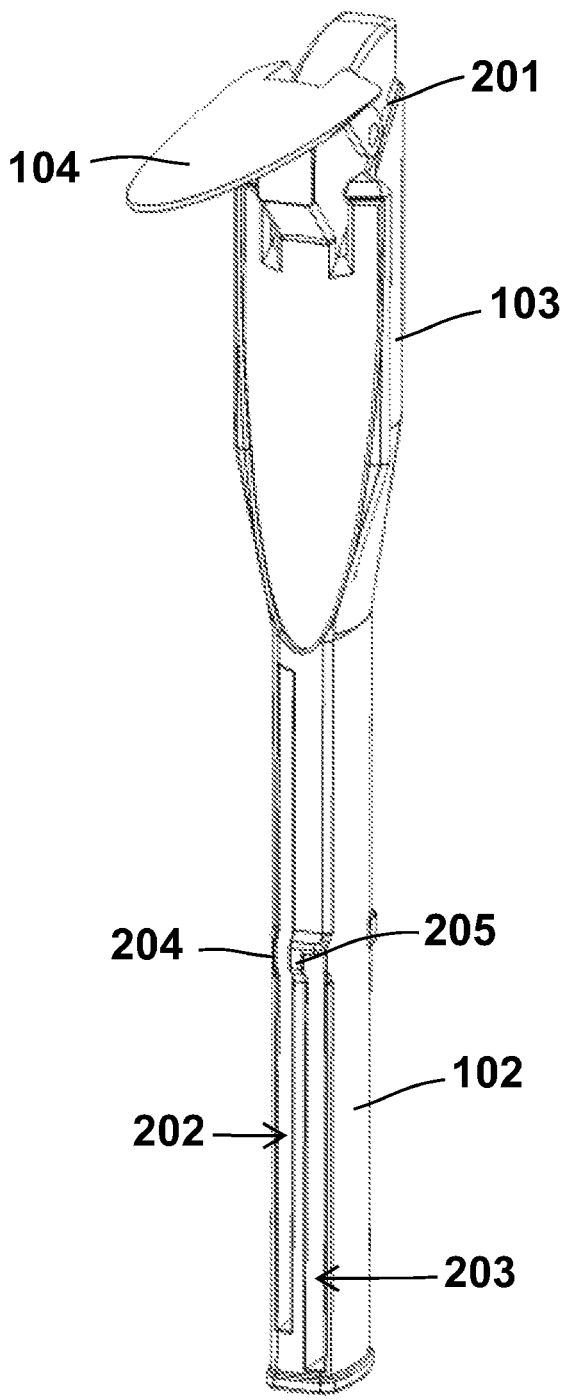
Fig. 1
Fig. 2

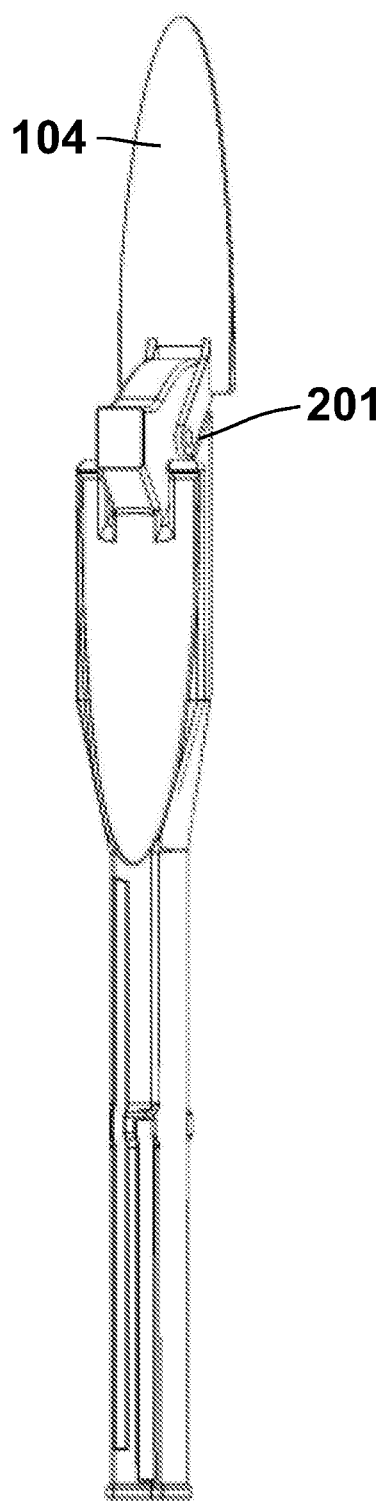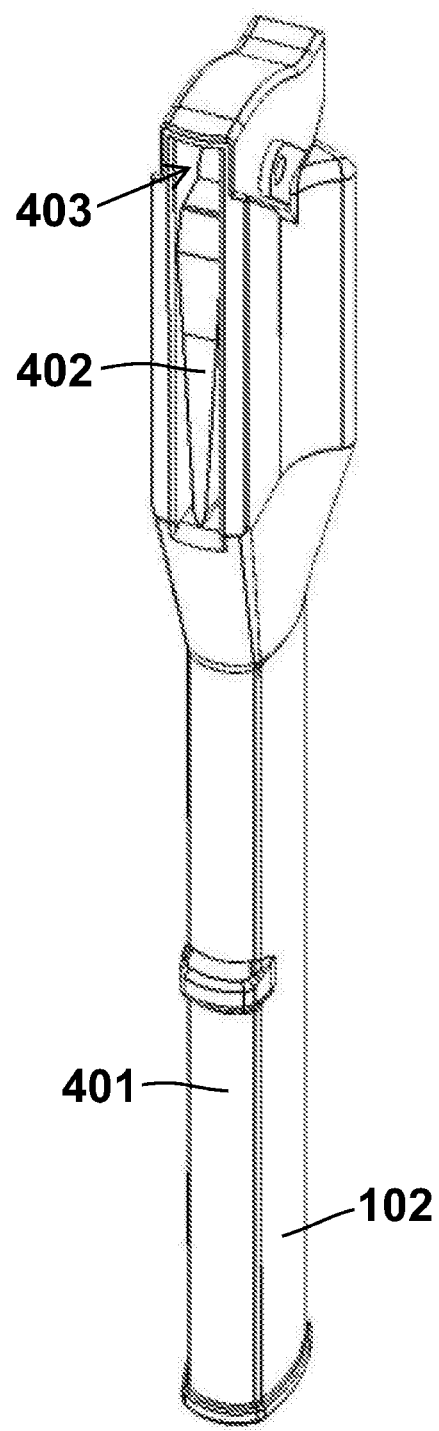
Fig. 3
Fig. 4

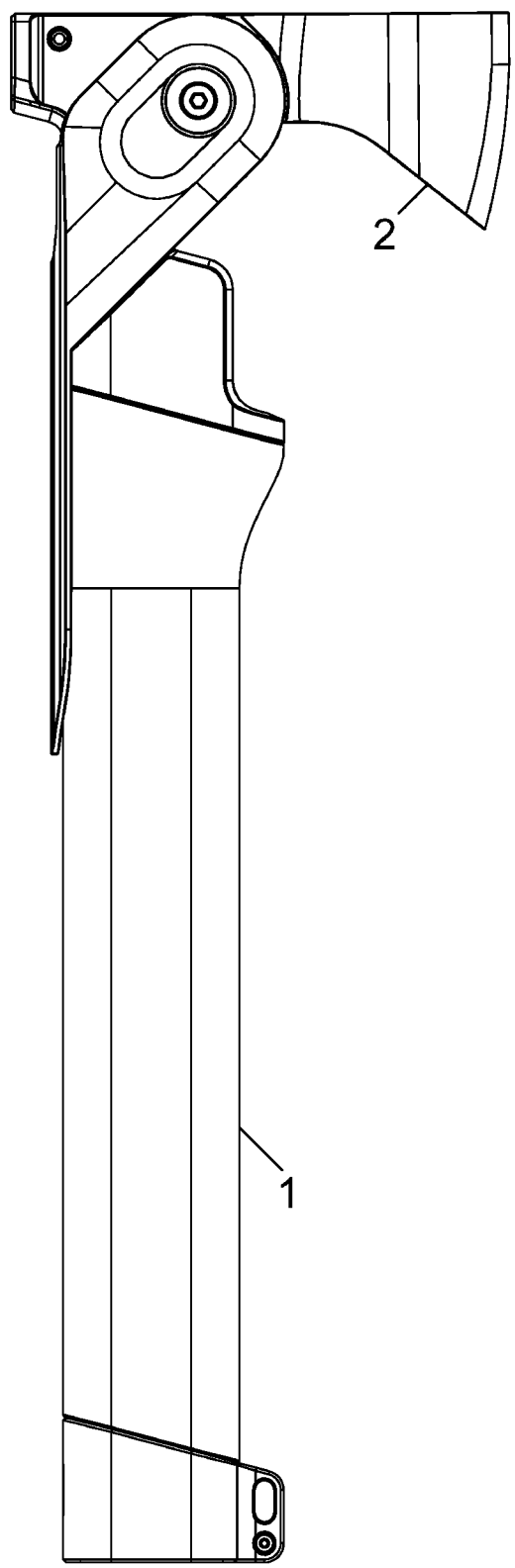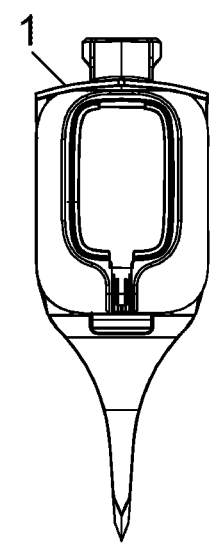
Fig. 14C
Fig. 14D

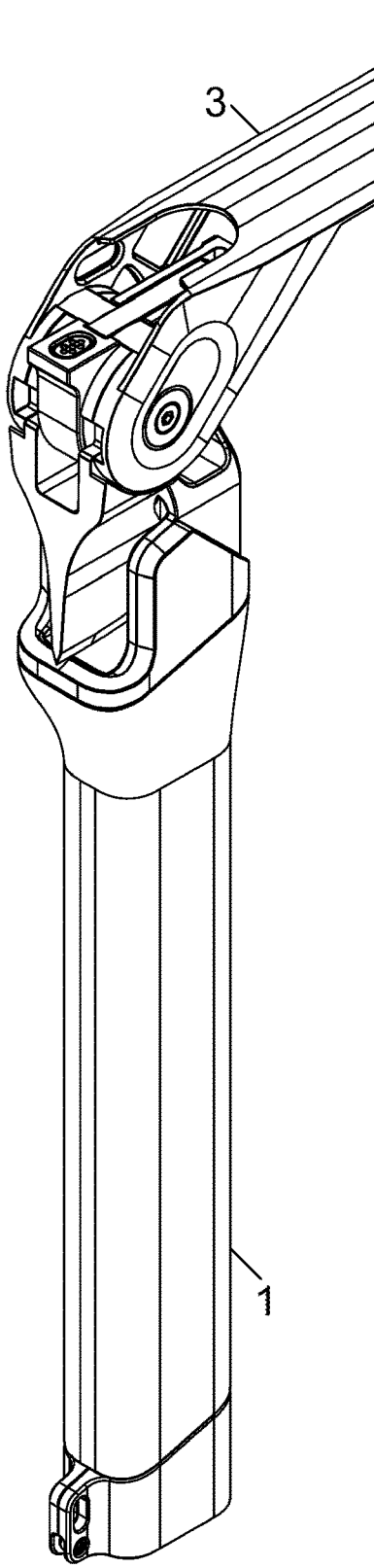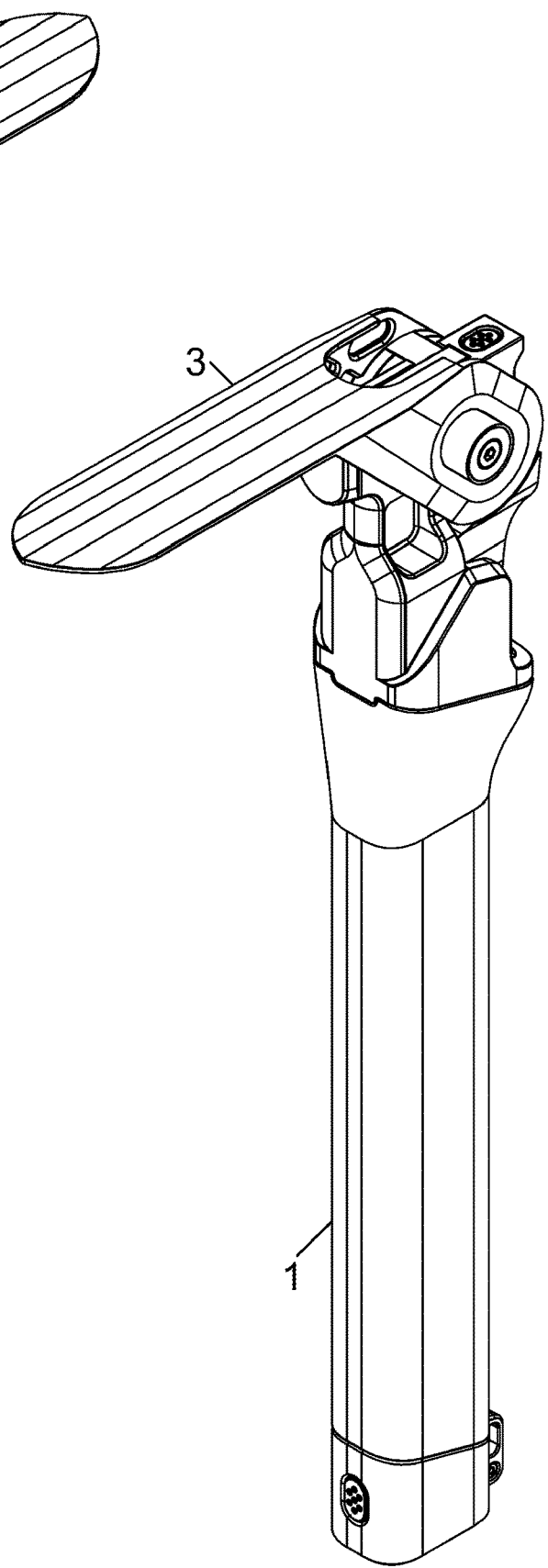
Fig. 15A
Fig. 15B

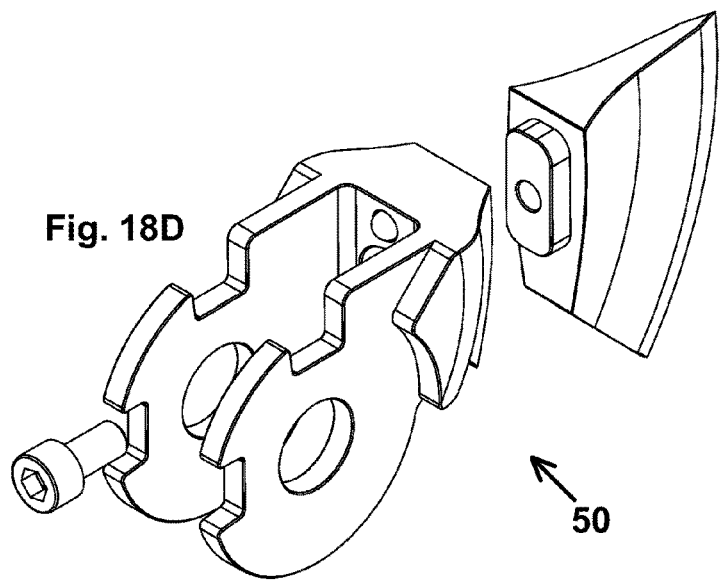
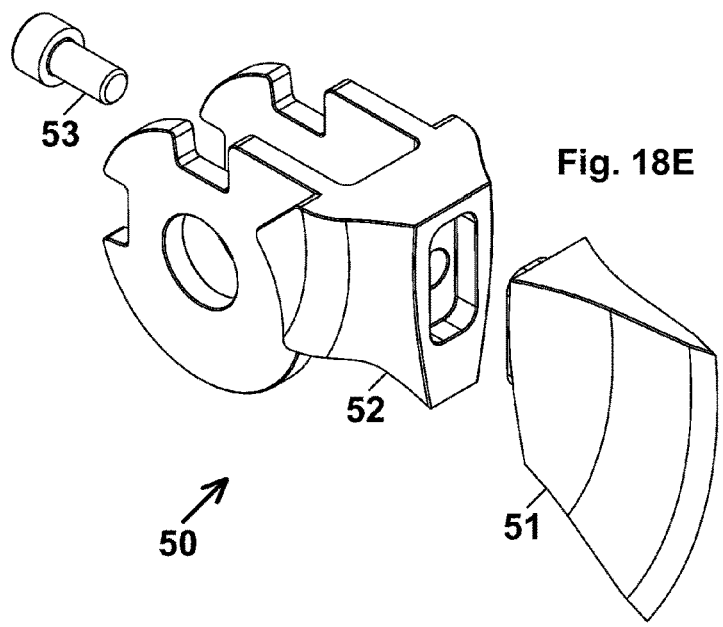
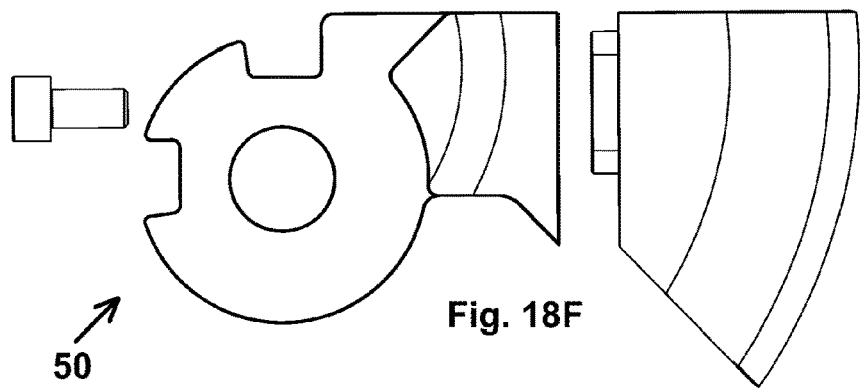

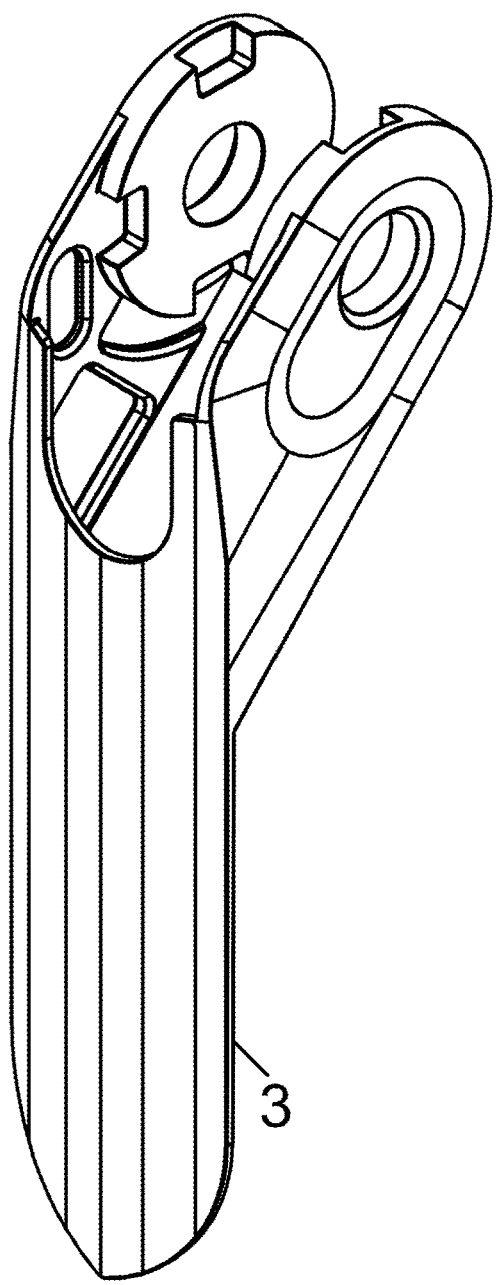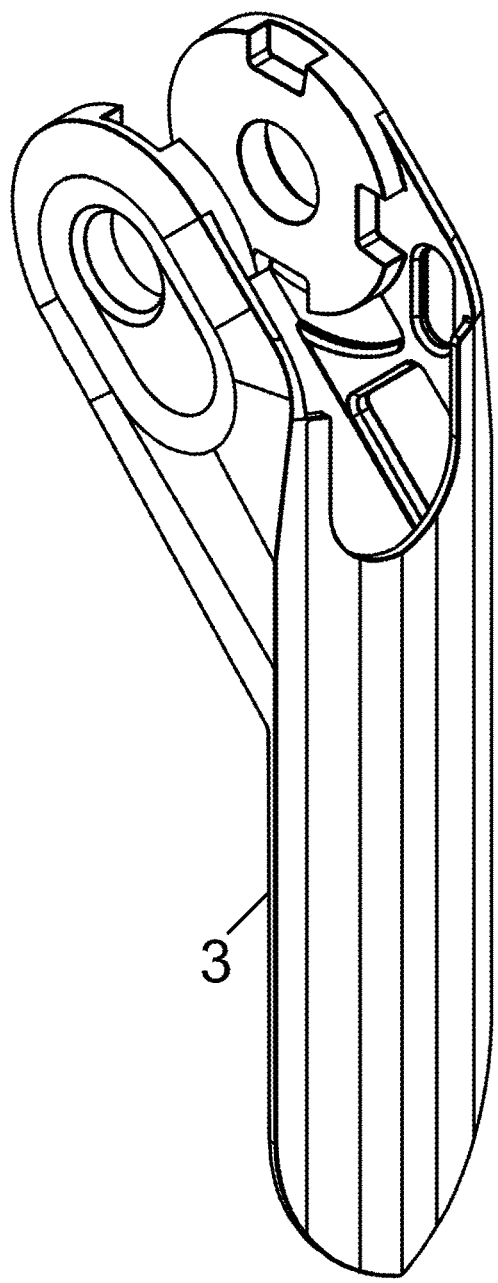
Fig. 21A
Fig. 21B

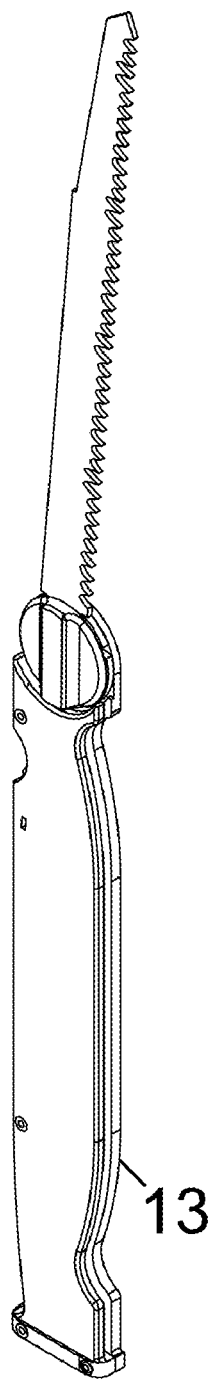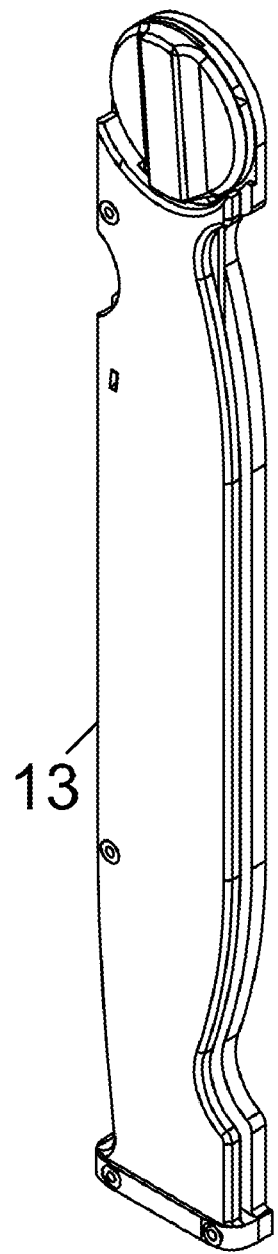
Fig. 23A
Fig. 23B

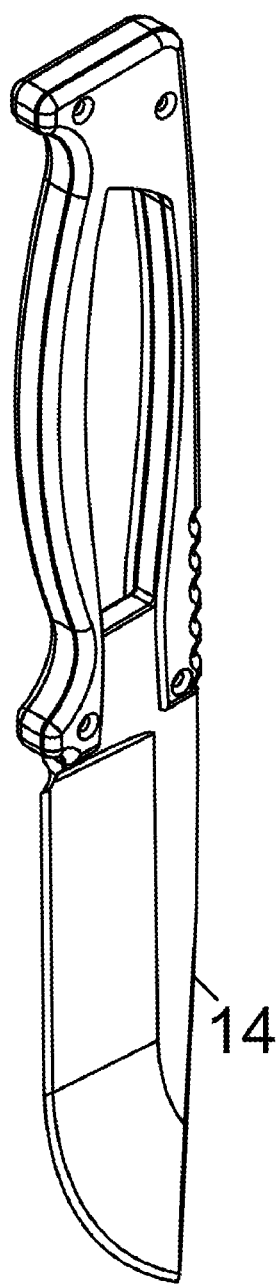
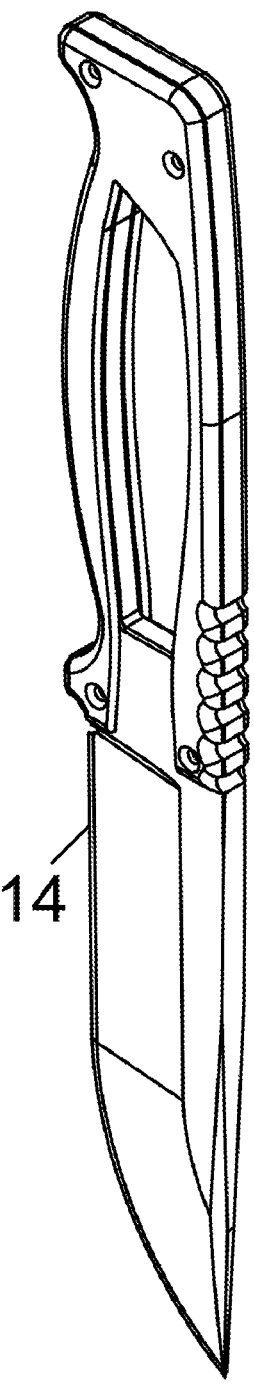
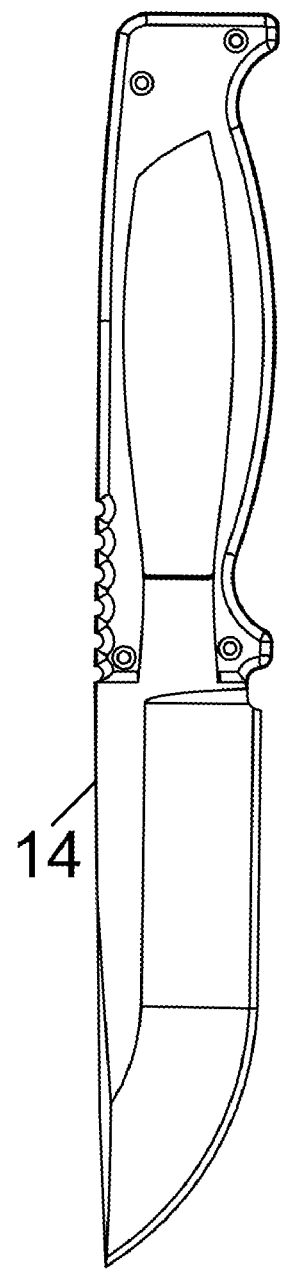
Fig. 24A
Fig. 24B
Fig. 24C

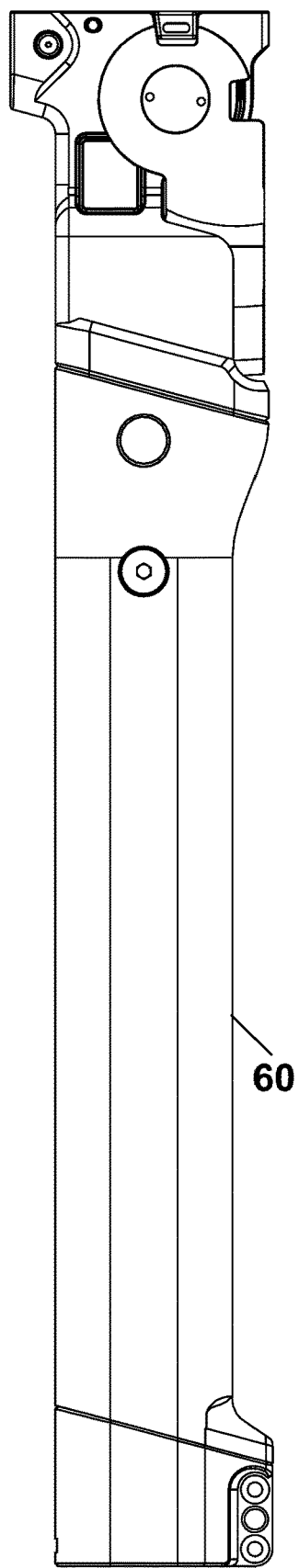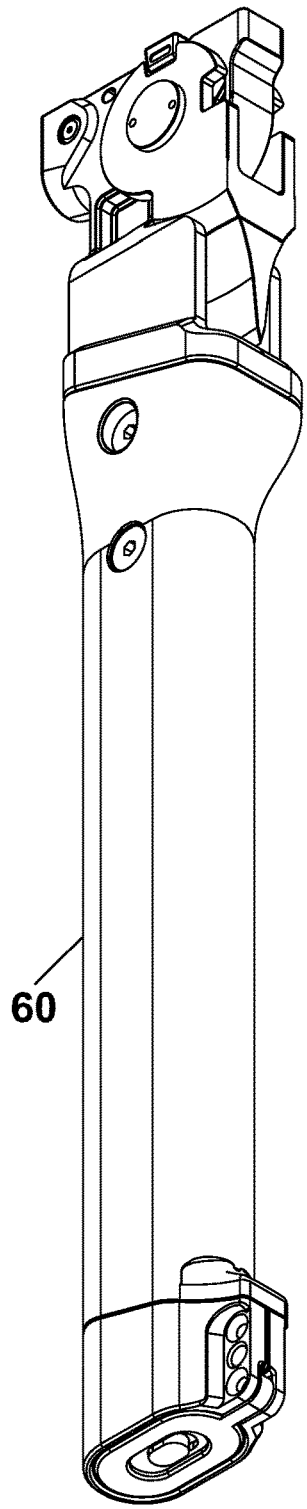
Fig. 29A
Fig. 29B

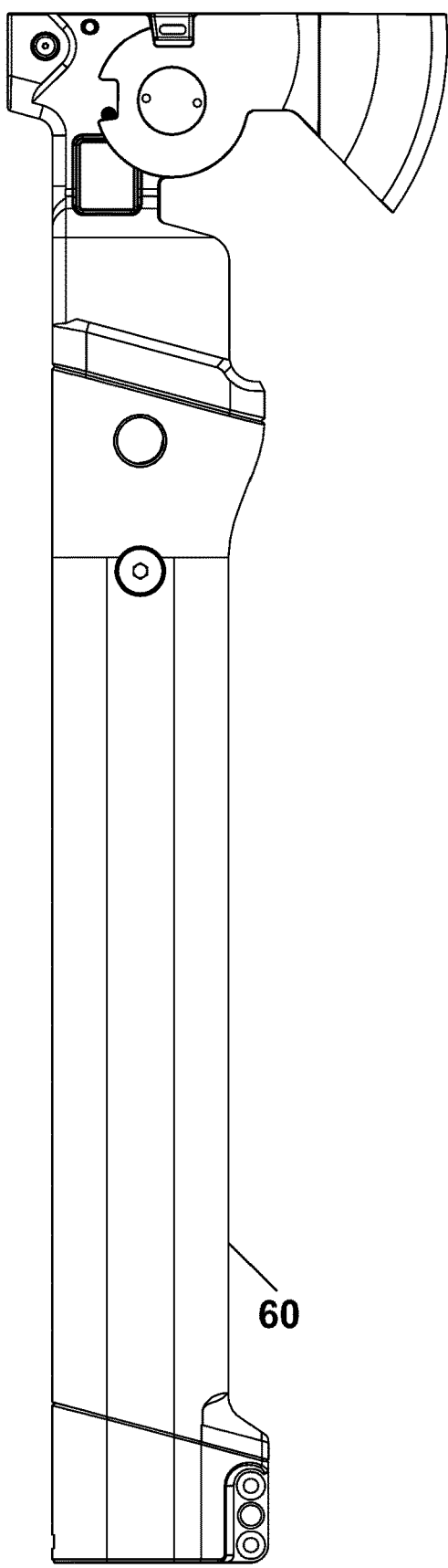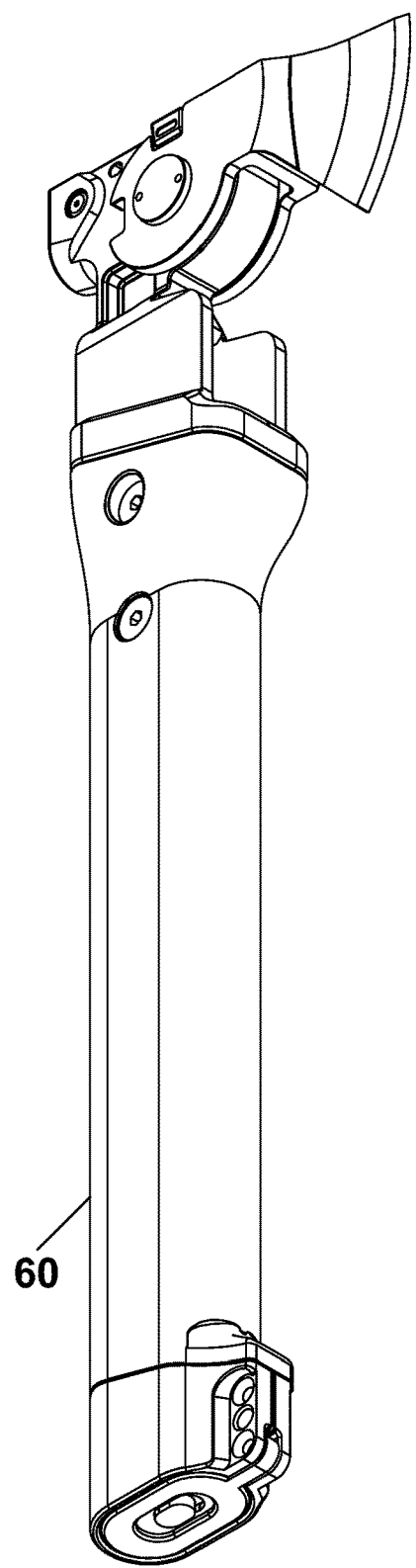
Fig. 29E
Fig. 29F

MULTI-PURPOSE TOOL

CROSS-REFERENCE TO RELATED APPLICATIONS

This patent application is a national stage of PCT international patent application number PCT/IB2016/053462, having an international filing date of Jun. 13, 2016, published as international publication number WO 2016/203355 A1, which is hereby incorporated by reference in its entirety.

The above-mentioned PCT international patent application number PCT/IB2016/053462 claims priority and benefit from (i) Israeli patent application number IL 239432, filed in the Israeli patent office on Jun. 15, 2015, which is hereby incorporated by reference in its entirety; and from (ii) United States provisional patent application number U.S. 62/295,148, filed in the United States patent office on Feb. 15, 2016, which is hereby incorporated by reference in its entirety.

FIELD

Some embodiments may relate to the field of mechanical tools.

BACKGROUND

Millions of users utilize various types of mechanical tools, in everyday life as well as in particular projects. For example, utensils (fork, spoon, knife) are often used for eating, all over the world. Similarly, a person may use a screwdriver in order to assemble a toy, or may utilize a bottle opener in order to open a sealed bottle of wine.

SUMMARY

The present invention may comprise a multi-purpose tool, or a multiple-purpose tool. In some demonstrative embodiments, for example, a multi-purpose tool may comprise: a hammer (or hammer-head); a folding or foldable axe; a folding or foldable spade or shovel (or spade head, or shovel head); and an assembly to enable a user to selectively fold and/or unfold one or more of the tools, or to selectively make one or more of the tools accessible or operational while also making one or more other tools non-accessible or non-operational.

Optionally, the multi-purpose tool may comprise an elongated handle, which may be hollow or may comprise an elongated cavity having a led or enclosure or removable cover. The elongated cavity within the handle of the multi-purpose tool, may optionally store one or more items or tools or inserts, which may be internally stored and secured within the handle; and which may be removed or extracted from the handle. Such stored tools may comprise, for example: a saw, or a folding saw; a knife; a combination of a knife with a sheath able to protect or store the knife or otherwise cover the blade of the knife; and/or other suitable inserts or tools.

The present invention may provide various other advantages and/or benefits.

BRIEF DESCRIPTION OF THE DRAWINGS

FIG. 1 is a schematic illustration of a side-view of a multi-purpose tool, in accordance with some demonstrative embodiments of the present invention.

FIG. 2 is a schematic illustration of a perspective view of the multi-purpose tool, demonstrating a shovel component in a partially open state, in accordance with some demonstrative embodiments of the present invention.

FIG. 3 is a schematic illustration of a perspective view of the multi-purpose tool, demonstrating the shovel component in a fully open state, in accordance with some demonstrative embodiments of the present invention.

FIG. 4 is a schematic illustration of a perspective view of the multi-purpose tool, demonstrating a handle cover and an axe component, in accordance with some demonstrative embodiments of the present invention.

FIG. 14C is a schematic illustration of a side view of the multi-purpose apparatus, demonstrating the axe in an open position, in accordance with some demonstrative embodiments of the present invention.

FIG. 14D is a schematic illustration of a top view of the multi-purpose apparatus, demonstrating the axe in an open position, in accordance with some demonstrative embodiments of the present invention.

FIGS. 15A-15B are schematic illustrations of perspective views of the multi-purpose apparatus, demonstrating its shovel in an open position at 90 degrees relative to the long dimension of the elongated handle, in accordance with some demonstrative embodiments of the present invention.

FIGS. 18D-18F are schematic illustrations of another implementation of the axe (detached or dis-assembled from the multi-purpose apparatus), in accordance with some demonstrative embodiments of the present invention.

FIGS. 21A-21B are schematic illustrations of the shovel (detached or dis-assembled from the multi-purpose apparatus), in accordance with some demonstrative embodiments of the present invention.

FIG. 23A is a schematic illustration of a saw in an open position, in accordance with some demonstrative embodiments of the present invention.

FIG. 23B is a schematic illustration of the saw in a closed or folded position, in accordance with some demonstrative embodiments of the present invention.

FIGS. 24A-24C are schematic illustrations of a knife, in accordance with some demonstrative embodiments of the present invention.

FIGS. 29A-29D are schematic illustrations of another multi-purpose device, shown in a closed axe position, in accordance with some demonstrative embodiments of the present invention.

FIGS. 29E-29H are schematic illustrations of that other multi-purpose device, shown in an open axe position, in accordance with some demonstrative embodiments of the present invention.

DETAILED DESCRIPTION OF SOME DEMONSTRATIVE EMBODIMENTS

Figure 5:
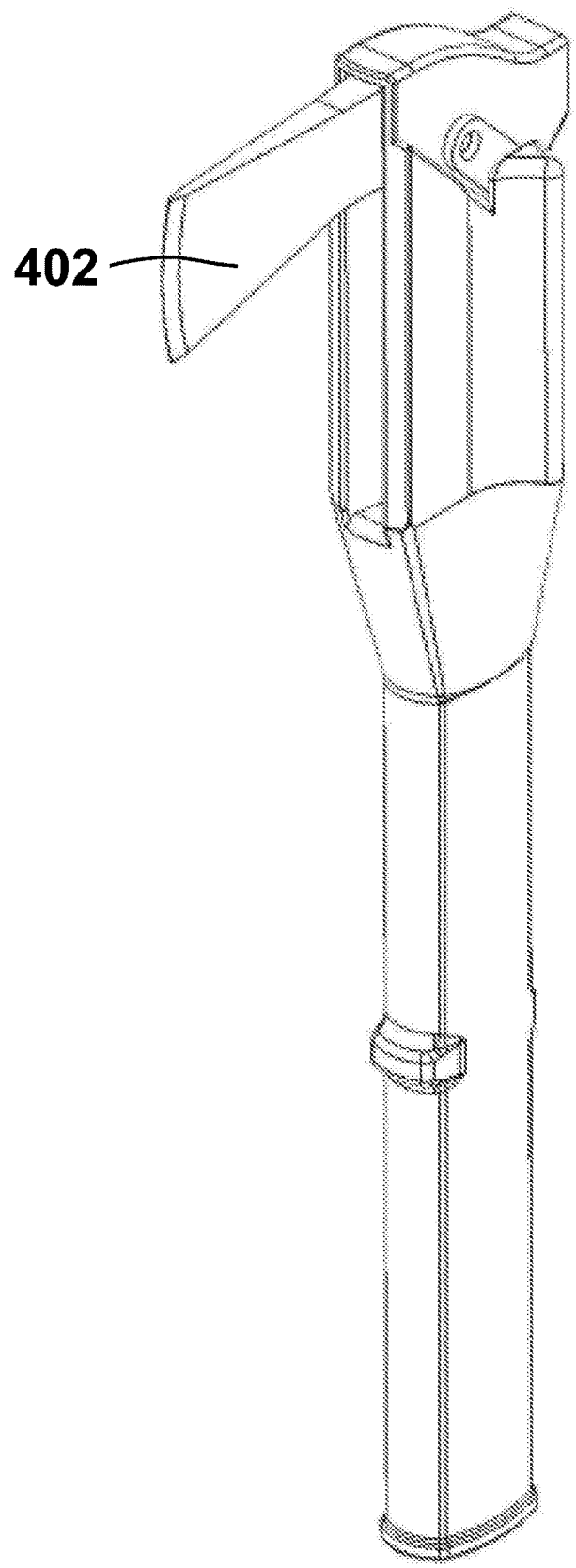
FIG. 5 is a schematic illustration of a perspective view of the multi-purpose tool, demonstrating the axe component in an open state, in accordance with some demonstrative embodiments of the present invention.

The present invention relates to mechanical tools. More particularly, the invention relates to a multi-tool device that combines several tools into one integrated device.

The use of tools is required in many occasions, whether at home or outdoors, but if a person needs to carry tools with him for an outdoors activity it is highly important to take under consideration the weight and volume of the tools that he or she carries with him/her.

Common outdoor activities that require the use of tools are, for example, camping, hunting, fishing, hiking, and climbing. There is also a need for tools in military, law enforcement, and first responder activities. The tools that are usually suitable for such needs are basic tools, such as a knife, saw, hammer, ax or axe or hatchet, and shovel or spade, which can be used for setting up tents or other forms of shelters, cutting different things like food or ropes or wood, and/or performing other suitable operations.

The cost of all necessary tools is often considerable and when planning an outdoor activity, the cumulative weight and volume of all tools can be an obstacle, since in some activities a user has to carry his equipment in a backpack. Even when traveling with a vehicle, a heavy and high-volume load can be a burden, and using separate tools can be inconvenient when searching for a specific tool. For those reasons, users sometimes choose to carry only some of the necessary tools, which can reduce the duration of stay and/or make it more difficult to manage outdoors.

Therefore, it is an object of the present invention to provide one integrated device that combines different types of tools, which can be easily carried and used, and is relatively lightweight. Other objects and advantages of the invention will become apparent as the description proceeds.

The present invention comprises a device comprising a plurality of tools operable in connection with a central structure, wherein all or part of the tools can be housed within the central structure, or part of the tools can be attached or attachable to its external surface, and wherein housed tools are suitable to be partially or fully pulled out of said structure and can be used separately or integrally with the structure, and wherein said structure is provided with connection means, suitable to be connected to tools at its external surface. The connection means can be, for example, fasteners and protrusions that are suitable to be attached to different structures that are provided with compatible parts, like holes and clips.

Tools that are suitable to be used in the invention can be for instance, shovel or spade, ax or axe, knife, saw, hammer, etc. The central structure can also have a portion that is suitable to be used as a hammer head. Each tool can be connected to the central structure be an axis, such as a rotational axis, or by any other known connection means, and the central structure can be provided with stopping means, suitable to constrain the movement of tools in relation to the structure.

The device may further comprise slits or cavities, suitable to house or store tools; and/or grip points or attachment points, suitable to hold tools within the slits until a suitable force is applied to displace them. The grip points may be suitable to provide tools the ability to rotate around them.

The tools may comprise holes and/or clips that are suitable to be connected to the connection means of the central structure, and they can also be foldable.

The present invention provides a device that comprises a plurality of tools operable in connection with a central structure. By the term "operable" it is meant that all or part of the tools can be housed within said central structure, or part of the tools can be attached or attachable to its external surface. The invention provides a relatively compact device that comprises basic tools; it provides significant advantages, such as a lightweight tool collection with relatively low volume, which makes it easier to carry than other known devices.

FIG. 1 is a side view of a device, according to one embodiment of the invention, showing the central structure 101, which is basically the skeleton of the device that comprises or is connected to different tools. Central structure 101 comprises two main parts, the lower part 102, which can also be referred to as "the handle", which is suitable to house relatively narrow tools, or any type of tools that will fit handle 102, and the upper part 103, which is suitable to house additional and/or wider tools. Exemplary tools will be illustrated in the following description.

FIG. 1 also shows a side view of a shovel 104, in a folded state, wherein shovel 104 is juxtaposed to central structure 101. Shovel 104 is connected to structure 101 by a rotational axis 105 and can be moved to an open state by pulling it so as to cause it to rotate around axis 105, as illustrated in FIGS. 2 and 3.

Another part of structure 101 is the edge 106, which can be used as a hammer Handle 102 can be used as a hammer handle, and edge 106 can be used as the tip of a hammer.

FIG. 2 is a perspective view of the device of FIG. 1, showing shovel 104 in a partially open state, and FIG. 3 is also a perspective view of the device of FIG. 1, in which shovel 104 is in a fully open state. As shown in FIG. 2, upper part 103 comprises a stopping mechanism 201, which, in this particular illustrative embodiment of the invention, is a stair-like structure, suitable to prevent shovel 104 from passing a predetermined point. The location of stopping mechanism 201 determines the limit of the rotation of shovel 104. FIG. 3 shows that stopping mechanism 201 limits the movement of shovel 104 so it will not move further than the point where shovel 104 is in line with central structure 101 when it is in an open state The location of stopping mechanism 201 can also be at any other desired location that will serve the purpose of limiting the movement of shovel 104 at a desired location. Central structure 101 can also comprise additional stopping mechanisms that will provide the ability to choose each time up to what extent one chooses to open shovel 104, since different activities may require different uses of shovel 104, and it provides a user the ability to adjust shovel 104 to his convenience.

FIG. 2 also shows slits 202 and 203 along handle 102, which are suitable for housing long and narrow tools. Such slits can be of any length, up to the length of handle 102, and handle 102 can comprise any number of slits of different dimensions that fits its volume. Handle 102 also comprises grip points 204 and 205 that are suitable to hold in place tools that are located inside slits 202 and 203. Grip points 204 and 205 can be of any type and shape of known gripping means, for example, they can consist of tightening means that can hold tools in place, and they can be ether noticeable, flat, or positioned in the internal part of handle 102.

Tools that are housed within slits 202 and 203 can be pulled out of them and used independently (as will be shown in FIG. 8), but they can also be used as a pocketknife-like device, and for that purpose grip points 204 and 205 can be designed to hold tools and allow their rotation, as in a pocketknife.

Slits 202 and 203 can be covered, as shown in FIG. 4, where cover 401 is connected to handle 102. The cover of slits 202 and 203 protects them and the tools that are located within them. Cover 401 can be very important when engaging in outdoor activity that can cause the device to be exposed to dirt, dust, sand or the like agents that may adversely affect the operation of the device. Slits 202 and 203 and cover 401 can also be provided on both sides of handle 102 (not shown), depending on the tools that need to be housed within handle 102 and their location.

FIG. 4 also shows an ax 402 in its folded state, located inside a large slit 403 at the upper part 102 of structure 101. Large slit 403 can also be covered, as slits 202 and 203, for the same purpose of protecting the components of the device. Ax 402 is connected to upper part 103 by a rotational axis (not shown) that provides it the ability to be opened, similarly to shovel 104. FIG. 5 shows ax 402 in an open state, which can be achieved by pulling ax 402, thus allowing it to rotate around its axis.

Figure 6:
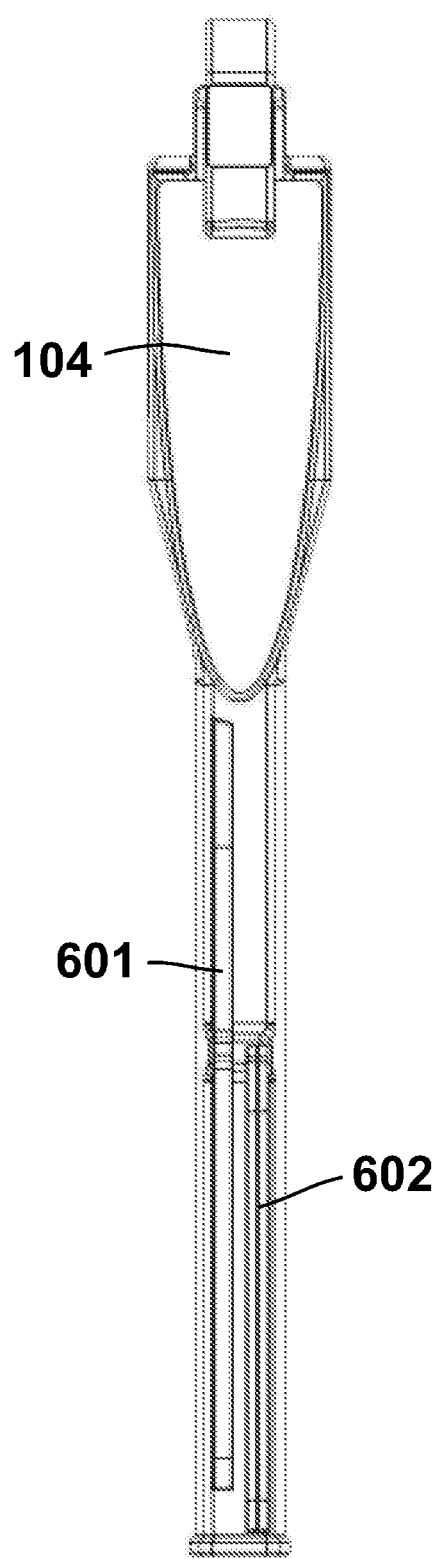
FIG. 6 is a schematic illustration of a front view of the multi-purpose tool, in accordance with some demonstrative embodiments of the present invention.

FIG. 6 is a front view of the device of FIG. 1, showing the front of shovel 104. According to this embodiment, the width of the device is essentially determined by the width of shovel 104, which is relatively narrow, thus presenting the great advantage of a low-volume device. The volume of the device can also be changeable by telescopic means, for example, lower part 102 can be inserted into upper part 103 by telescopic means in order to reduce the volume, or alternatively, both parts 102 and 103 can be connected to each other by an axis that allows folding the device. Such volume- or length-controlling means can also be used for the purpose of extending the length of handle 102, which can be useful when trying to reach remote targets. Even if the device is not foldable, it is still relatively short because each tool is in close juxtaposition to, or housed within central structure 101, when not in use. The length of an illustrative device, according to the embodiment of FIG. 1, is only about 45 cm.

Figure 7:
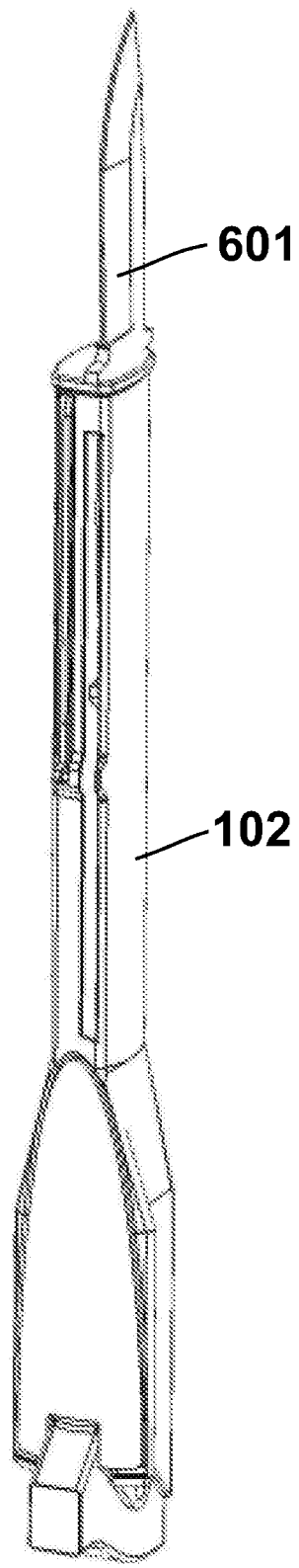
FIG. 7 is a schematic illustration of a perspective view of the multi-purpose tool, demonstrating a knife component that is connected at an edge of the handle of the multi-purpose tool, in accordance with some demonstrative embodiments of the present invention.

FIG. 6 also shows two exemplary tools that are housed inside handle 102. The exemplary tools are knife 601 and saw 602. As shown in FIG. 7, knife 601 can be positioned at the bottom edge of handle 102. The positioning of knife 601 can be performed by pulling out knife 601 from handle 102 and inserting its lower section into a suitable slit at the bottom part of handle 102, but it can also be performed by any other mechanical means that will provide the possibly to position knife 601 at the bottom of handle 102, and the shape of slit 202 can be designed accordingly.

Figure 8:
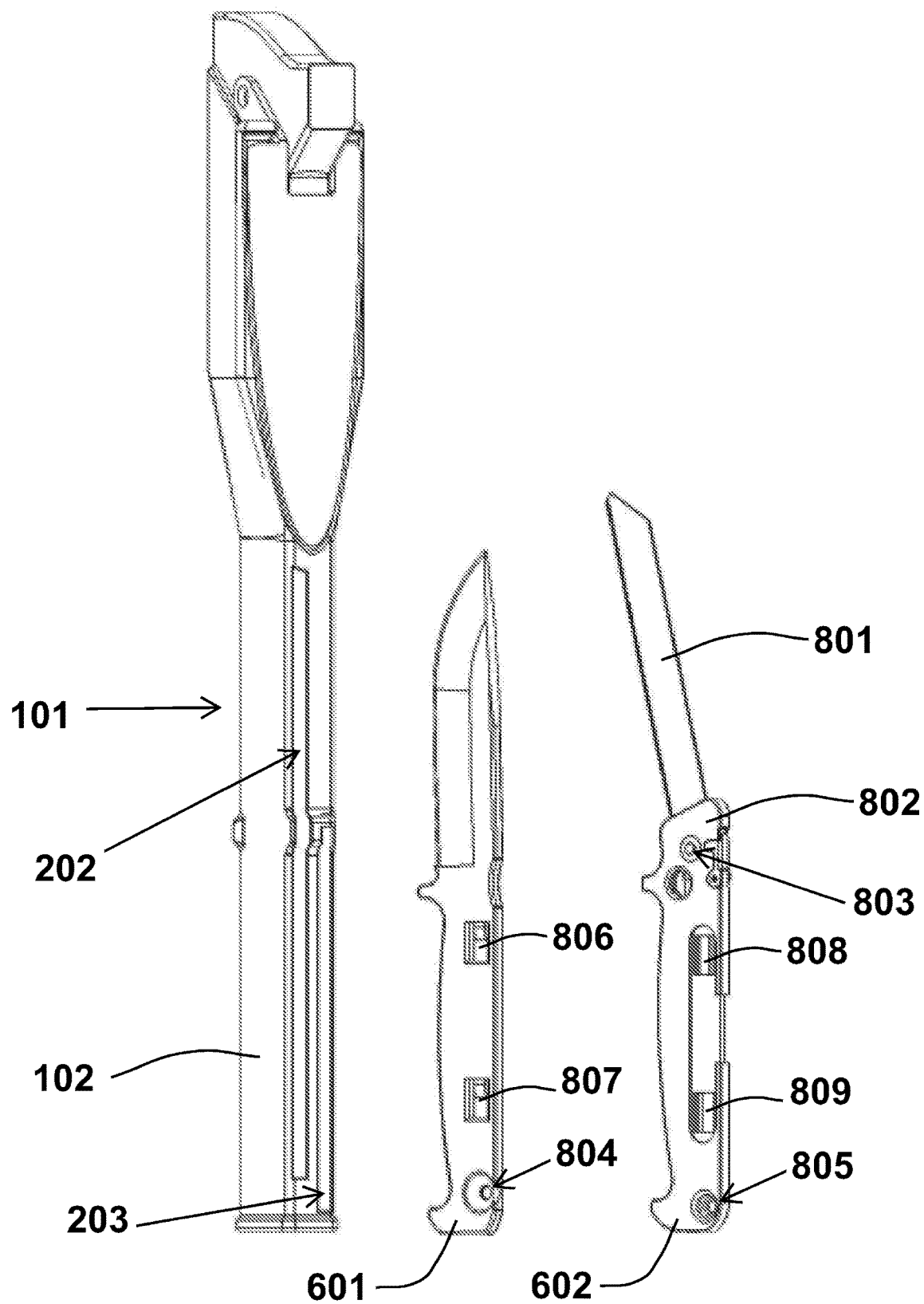
FIG. 8 is a schematic illustration of a perspective view of the multi-purpose tool, demonstrating a knife and a saw, previously housed within the handle of the multi-purpose tool and extracted from the handle, in accordance with some demonstrative embodiments of the present invention.

FIG. 8 shows knife 601 and saw 602 separately from handle 102. Saw 602 is shown in FIG. 6 in a folded state, and in FIG. 8 it is shown that the blade 801 of saw 602 is connected to its base 802 by axis 803, thus allowing saw 602 to be folded. Of course, knife 601 can also be foldable by providing it with a similar axis. In the particular embodiment of FIG. 8 knife 601 and saw 602 comprise holes, e.g. 804 and 805, and clips, e.g., 806, 807, 808, and 809, all which are suitable to provide the ability to connect knife 601 and saw 602 to external surfaces of structure 101 or to any other suitable structures.

Figure 9:
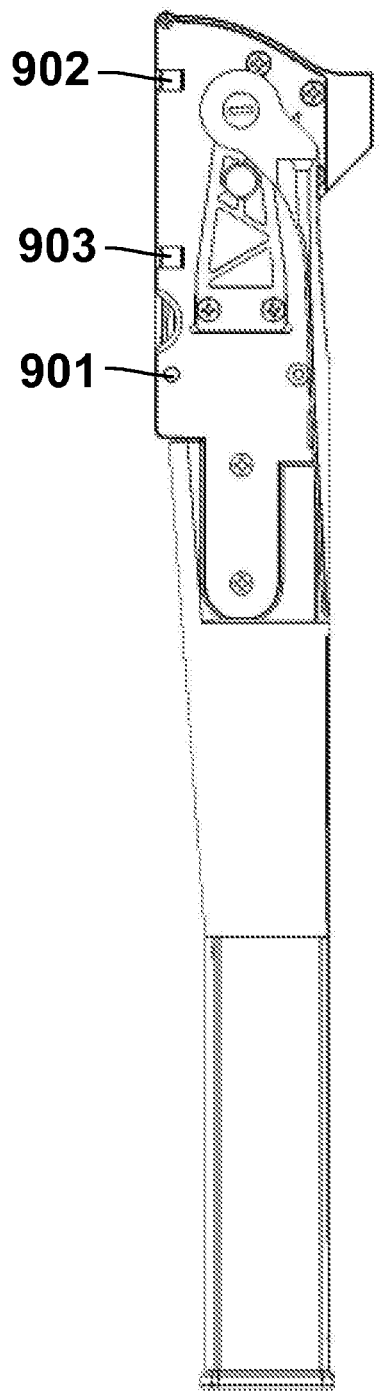
FIG. 9 is a schematic illustration of a side view of a multi-purpose device, demonstrating connection means that may be suitable to connect or attach tool(s) to the outer side of the multi-purpose device, in accordance with some demonstrative embodiments of the present invention.
Figure 10:
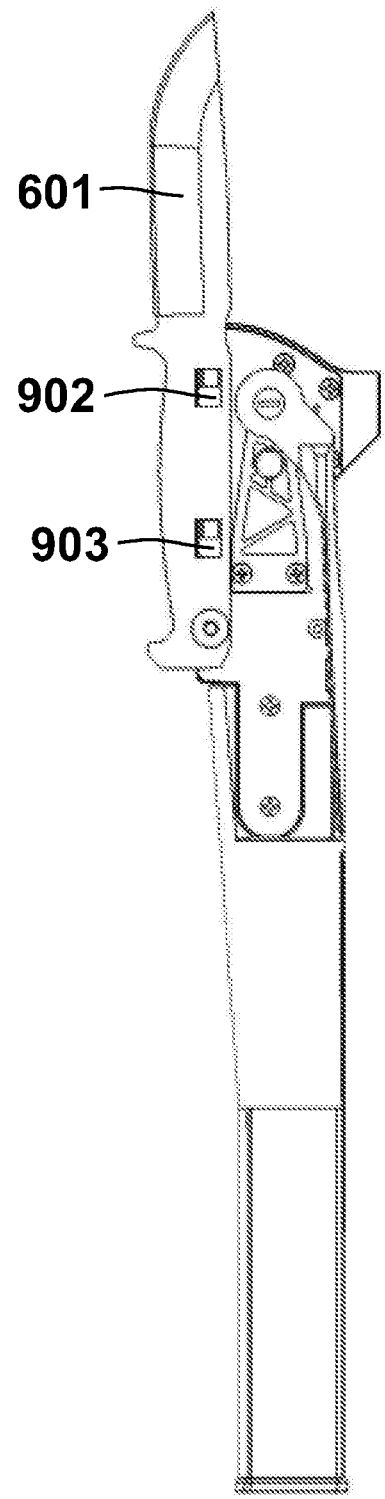
FIG. 10 is a schematic illustration of a side view of the multi-purpose device, having a knife component connected thereto, in accordance with some demonstrative embodiments of the present invention.

FIG. 9 is a side view of the device, according to another embodiment of the invention, illustrating an exposed upper part (without a cover) showing connection means such as protrusion 901, and fasteners 902 and 903, which are suitable to connect to tools like knife 601 and saw 602 by connection means like holes 804 and 805 and clips 806, 807, 808, and 809. FIG. 10 is a side view of the device of FIG. 9, where knife 601 is connected to the device of FIG. 9 by protrusion 901 and fasteners 902 and 903. Such connection provides the ability to extend the distance at which knife 601 can be used by holding the device by its handle.

Figure 11:
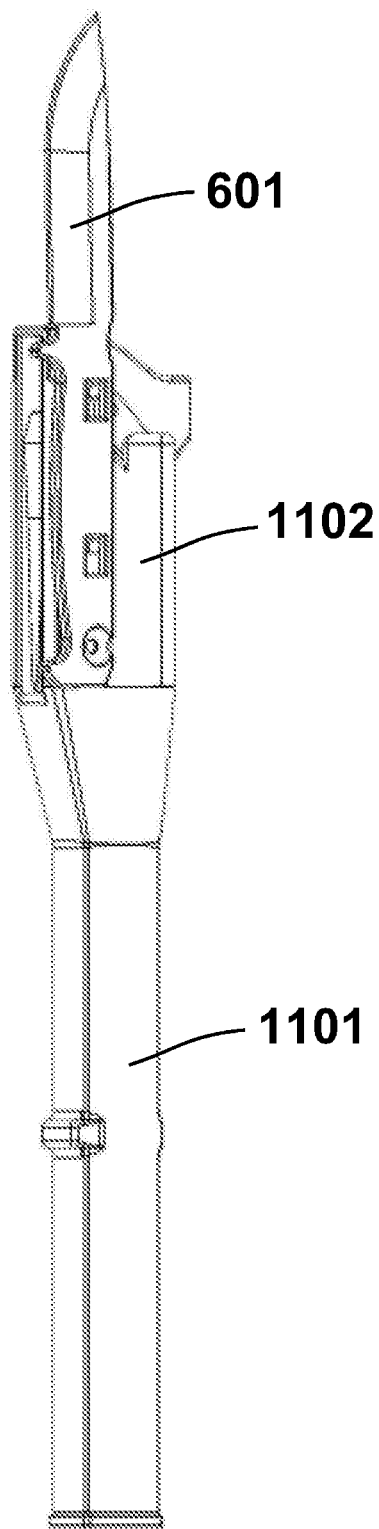
FIG. 11 is a schematic illustration of a perspective view of the multi-purpose device, demonstrating the knife component, in accordance with some demonstrative embodiments of the present invention.
Figure 12:
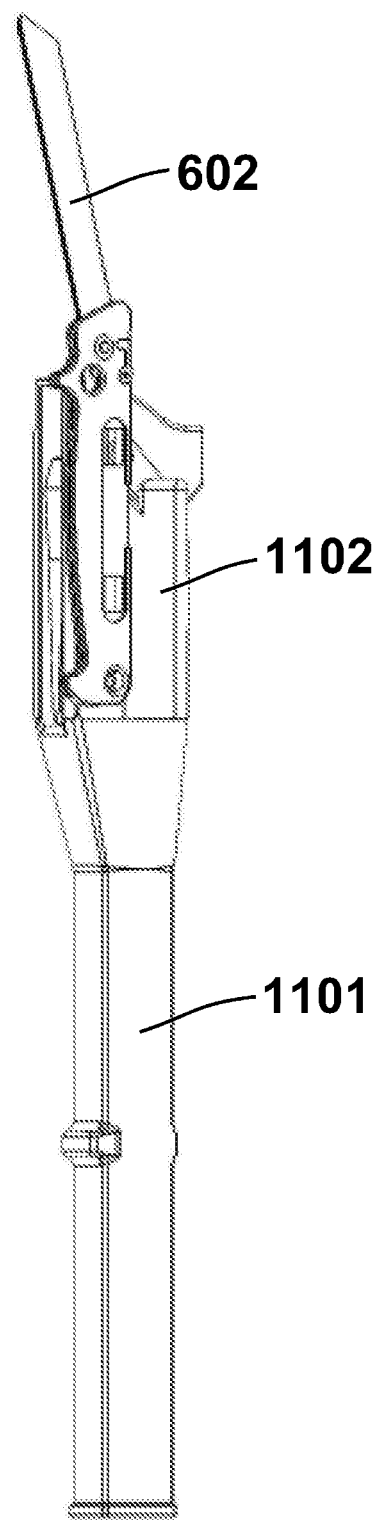
FIG. 12 is a schematic illustration of a perspective view of the multi-purpose device, demonstrating a saw component connected thereto, in accordance with some demonstrative embodiments of the present invention.

FIG. 11 shows knife 601 connected to the device of FIG. 9, indicated by numeral 1101, where the upper part of device 1101 is provided with a cover 1102, and FIG. 12 shows saw 602 connected to device 1101 (which is also provided with cover 1102). The connection of tools to the device at the outer side of the structure can be performed not only by protrusions and fasteners as shown in FIG. 10, but also by any other mechanical connection means, such as a rails or bands.

Although for the sake of brevity the description refers only to a shovel, an ax, a hammer, a knife, and a saw, the device can comprise in the alternative or in addition, many other tools, and the user can also decide which tools he wishes to carry with him. Nothing in the above description should be interpreted as a limitation to the kind of tool that can be used in conjunction with the invention.

The device of the invention may be highly versatile and/or modular, thus is suitable for many types of activities. The combination of a large number of tools in a single device is very cost-efficient. Another significant advantage is the fact that a relatively small device can be used in many forms, which saves users the trouble of carrying heavy and high-volume tools instead.

The present invention may provide a device comprising a plurality of tools operable in connection with a central structure, wherein all or part of the tools can be housed within said central structure, or part of the tools can be attached or attachable to its external surface, and wherein housed tools are suitable to be partially or fully pulled out of said structure and can be used separately or integrally with said structure, and wherein said central structure is provided with connection means, suitable to be connected to tools at its external surface.

In some embodiments, one of the tools or units of the device is a shovel or a spade or a knife or a saw or a hammer or an axe. In some embodiments, some or all of these units are comprised in the device or mounted on the device.

In some embodiments, at least one of the above-mentioned units is connected to the structure by a rotational axis. In some embodiments, the device comprises a stopping mechanism, suitable to constrain the movement of tools in relation to the structure.

In some embodiments, the device comprises comprising slits, suitable to house tools.

In some embodiments, the device comprises grip points, suitable to hold tools within the slits until a suitable force is applied to displace them. In some embodiments, the grip points provide tools the ability to rotate around them.

In some embodiments, one of the tools is an ax or axe. In some embodiments, the ax is connected to the central structure by a rotational axis. In some embodiments, the central structure has a portion that is suitable to be used as a hammer head. In some embodiments, one of the tools is a knife or a saw. In some embodiments, the knife comprises holes and/or clips that are suitable to be connected to the connection means of the central structure. In some embodiments, the saw comprises holes and/or clips that are suitable to be connected to the connection means of the central structure. In some embodiments, the knife is foldable. In some embodiments, the saw is foldable.

The present invention may comprise a multi-purpose tool, or a tool assembly, or a multi-unit or multiple-unit tool, which may be used for various purposes (e.g., hiking, outdoor survival, military use, law enforcement, first responders, or the like).

Figure 13A:
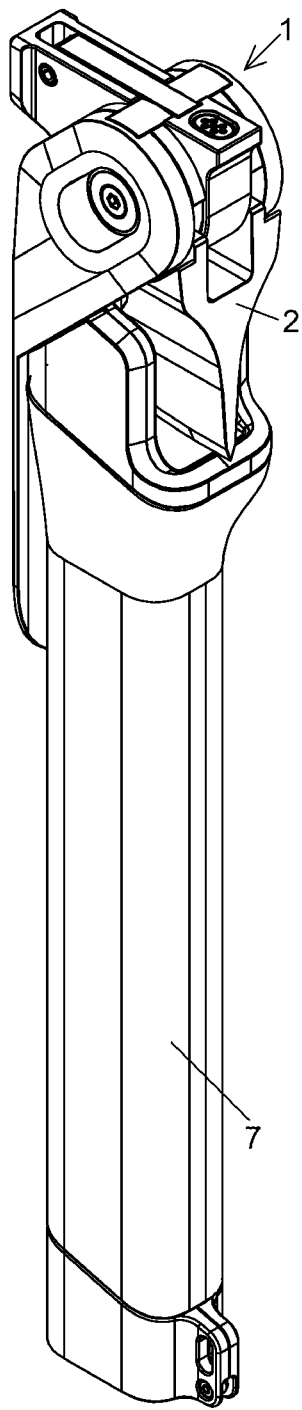
FIGS. 13A-13B are schematic illustrations of perspective views of a multi-purpose apparatus, shown in a closed position, in accordance with some demonstrative embodiments of the present invention.
Figure 13B:
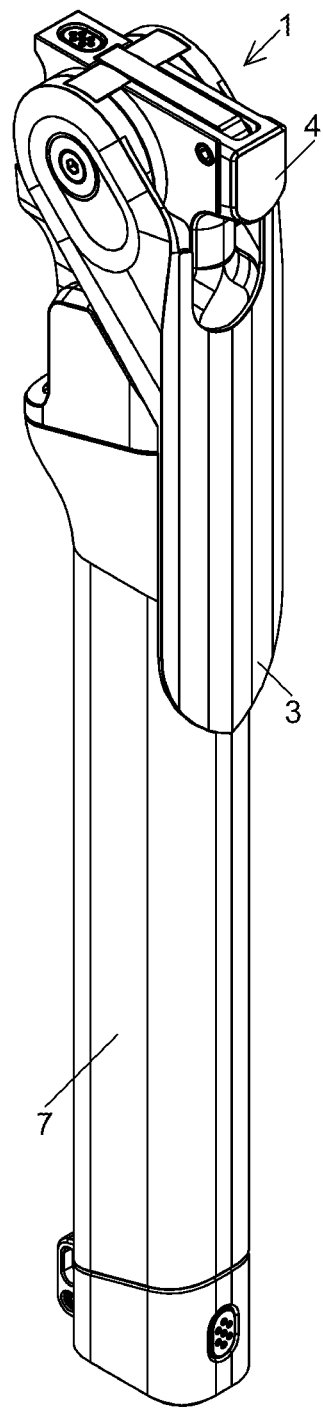

FIGS. 13A-13B are schematic illustrations of perspective views of a multi-purpose apparatus 1, shown in a closed position, in accordance with some demonstrative embodiments of the present invention. Multi-purpose apparatus 1 may comprise, for example, a folding axe 2, a folding shovel 3, a hammer-head 4, and an elongated handle 7.

Figure 14A:
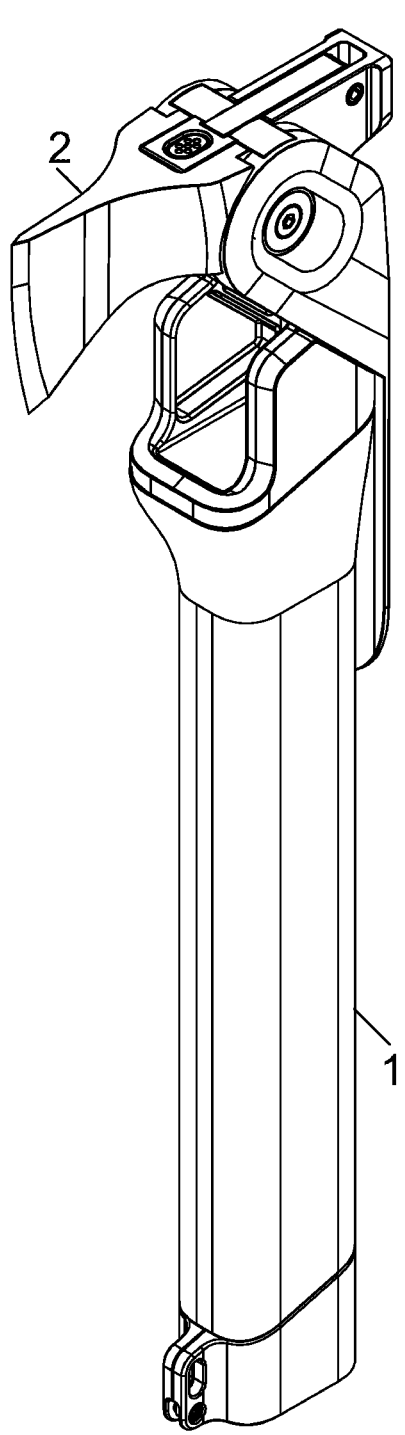
FIGS. 14A-14B are schematic illustrations of perspective views of the multi-purpose apparatus, demonstrating its axe in an open position, in accordance with some demonstrative embodiments of the present invention.
Figure 14B:
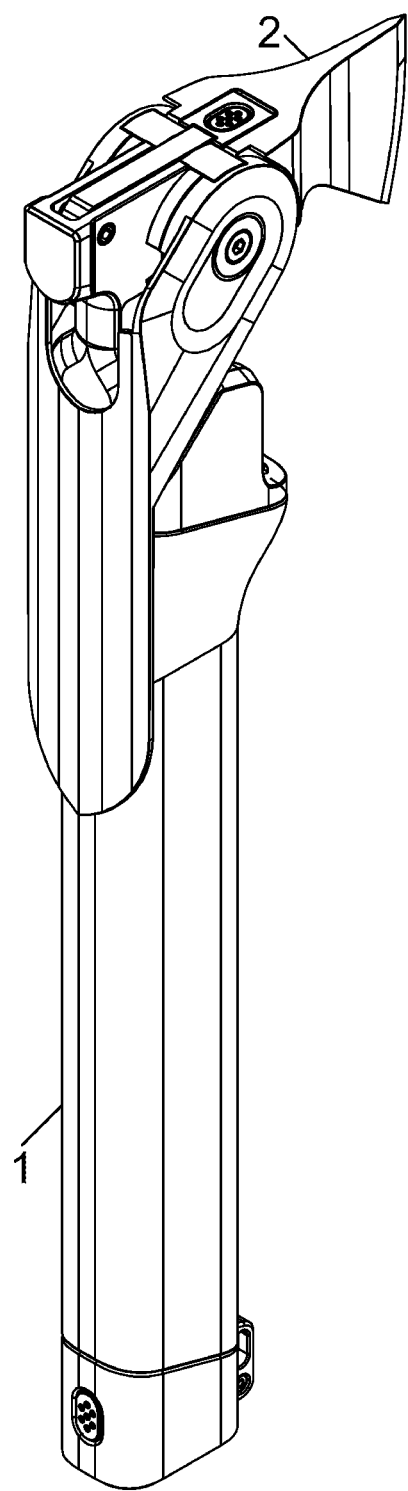

FIGS. 14A-14B are schematic illustrations of perspective views of the multi-purpose apparatus 1, demonstrating the axe 2 in an open position, in accordance with some demonstrative embodiments of the present invention.

FIG. 14C is a schematic illustration of a side view of the multi-purpose apparatus 1, demonstrating the axe 2 in an open position, in accordance with some demonstrative embodiments of the present invention.

FIG. 14D is a schematic illustration of a top view of the multi-purpose apparatus 1, demonstrating the axe 2 in an open position, in accordance with some demonstrative embodiments of the present invention.

FIGS. 15A-15B are schematic illustrations of perspective views of the multi-purpose apparatus 1, demonstrating the shovel 3 in an open position at 90 degrees relative to the long dimension of the elongated handle 7, in accordance with some demonstrative embodiments of the present invention.

Figure 15C:
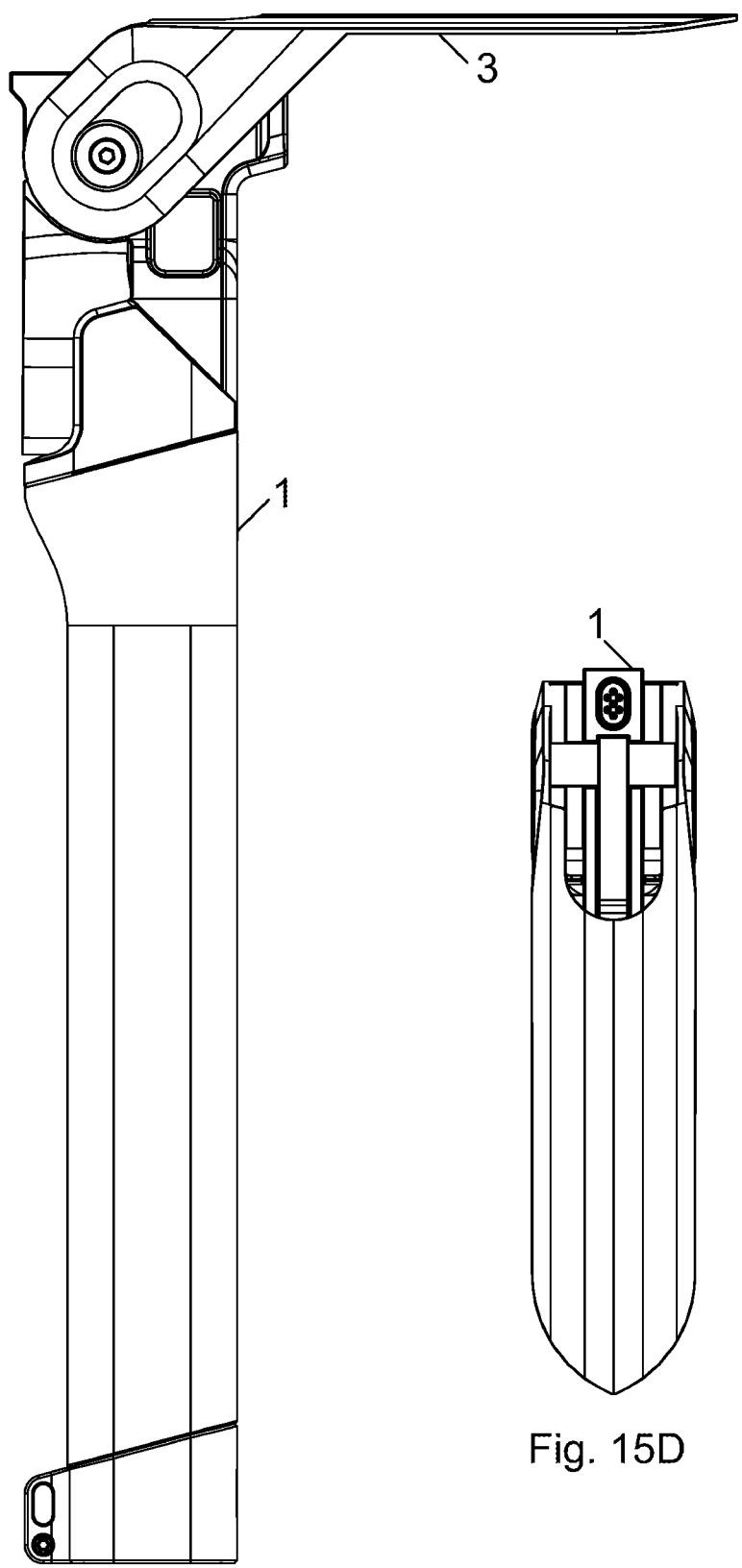
FIG. 15C is a schematic illustration of a side view of the multi-purpose apparatus, demonstrating the shovel in an open position at 90 degrees relative to the long dimension of the elongated handle, in accordance with some demonstrative embodiments of the present invention.

FIG. 15C is a schematic illustration of a side view of the multi-purpose apparatus 1, demonstrating the shovel 3 in an open position at 90 degrees relative to the long dimension of the elongated handle 7, in accordance with some demonstrative embodiments of the present invention.

Figure 15D:
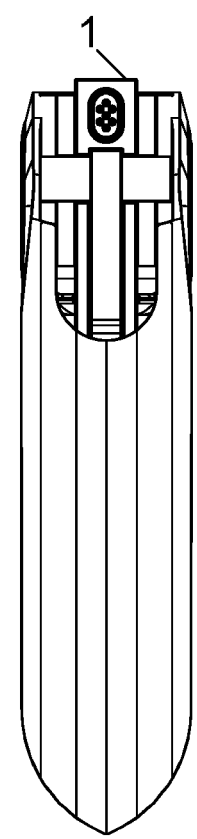
FIG. 15D is a schematic illustration of a top view of the multi-purpose apparatus, demonstrating the shovel in an open position at 90 degrees relative to the long dimension of the elongated handle, in accordance with some demonstrative embodiments of the present invention.

FIG. 15D is a schematic illustration of a top view of the multi-purpose apparatus 1, demonstrating the shovel 3 in an open position at 90 degrees relative to the long dimension of the elongated handle 7, in accordance with some demonstrative embodiments of the present invention.

Figure 15E:
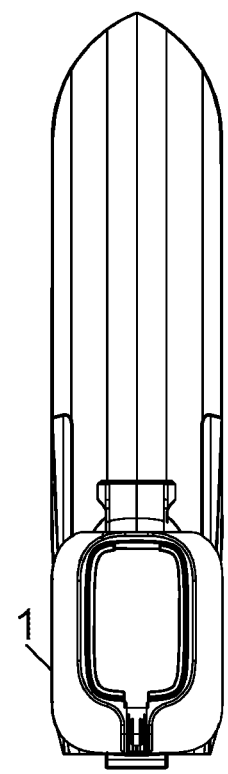
FIG. 15E is a schematic illustration of a bottom view of the multi-purpose apparatus, demonstrating the shovel in an open position at 90 degrees relative to the long dimension of the elongated handle, in accordance with some demonstrative embodiments of the present invention.

FIG. 15E is a schematic illustration of a bottom view of the multi-purpose apparatus 1, demonstrating the shovel 3 in an open position at 90 degrees relative to the long dimension of the elongated handle 7, in accordance with some demonstrative embodiments of the present invention.

Figure 16A:
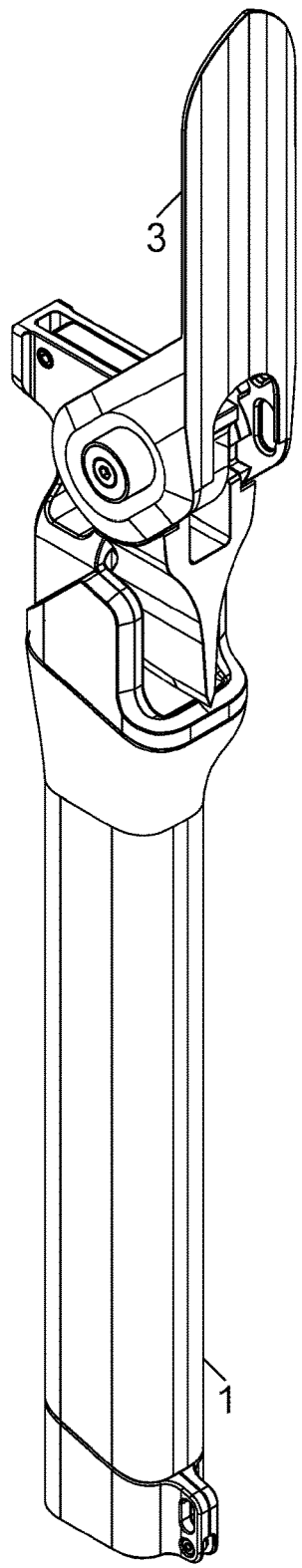
FIGS. 16A-16B are schematic illustrations of perspective views of the multi-purpose apparatus, demonstrating the shovel in an open position at 180 degrees relative to the long dimension of the elongated handle, in accordance with some demonstrative embodiments of the present invention.
Figure 16B:
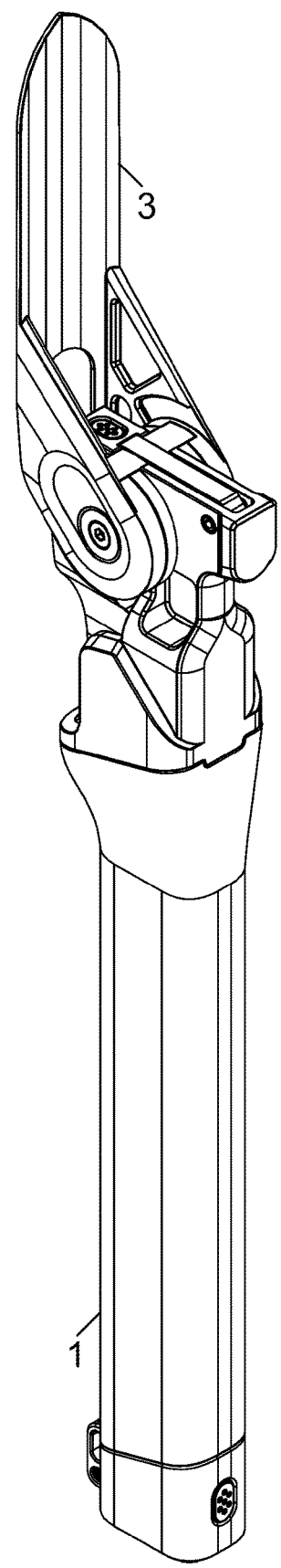
Figure 17A:
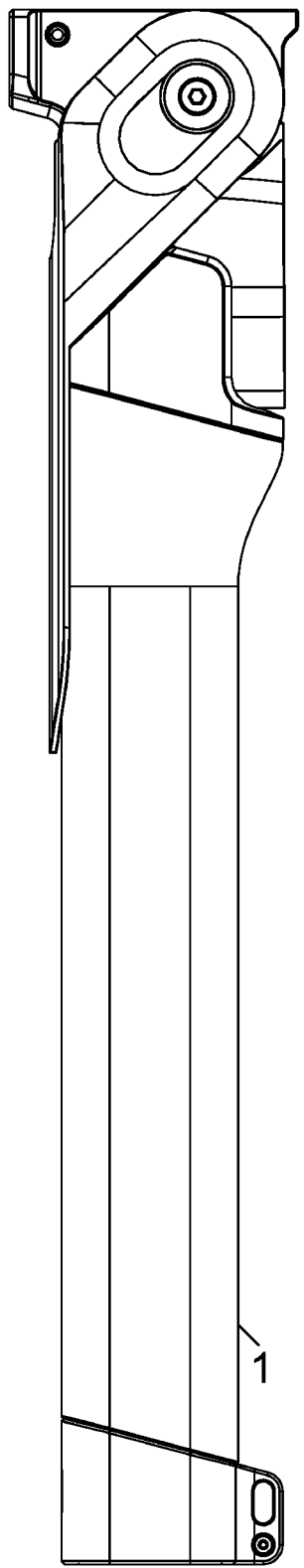
FIGS. 17A-17F are schematic illustrations of side-views of the multi-purpose apparatus in a closed position, in accordance with some demonstrative embodiments of the present invention.
Figure 17B:
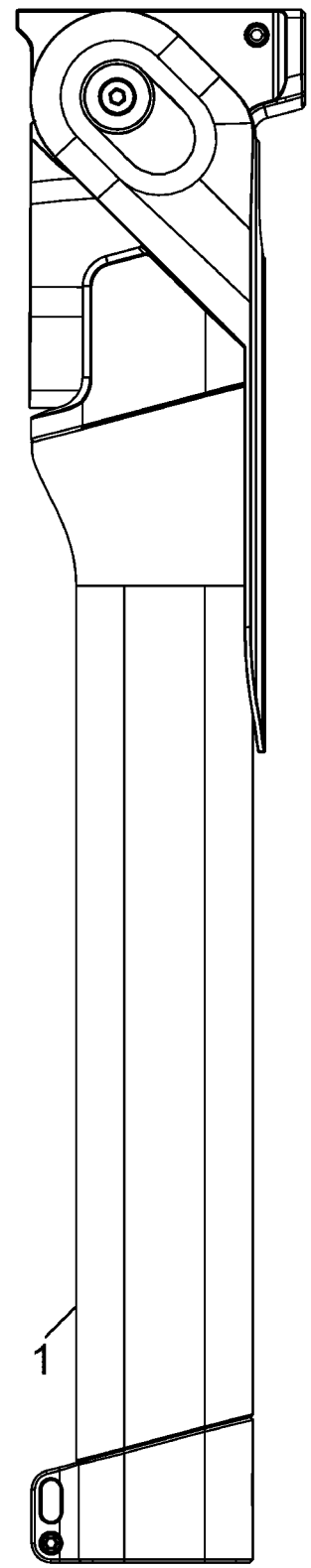
Figure 17C:
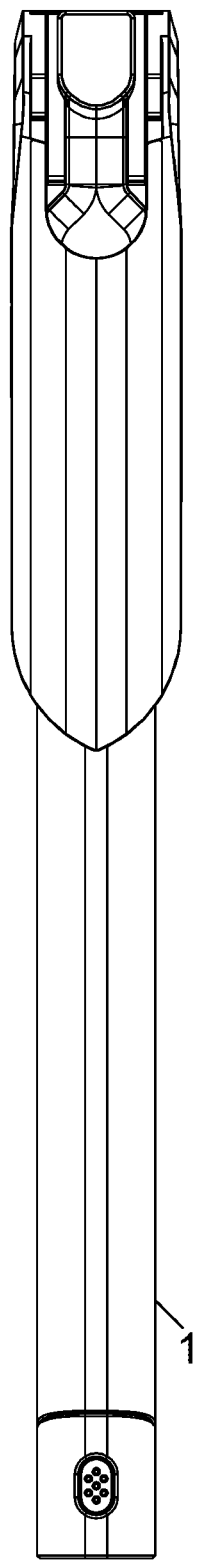
Figure 17D:
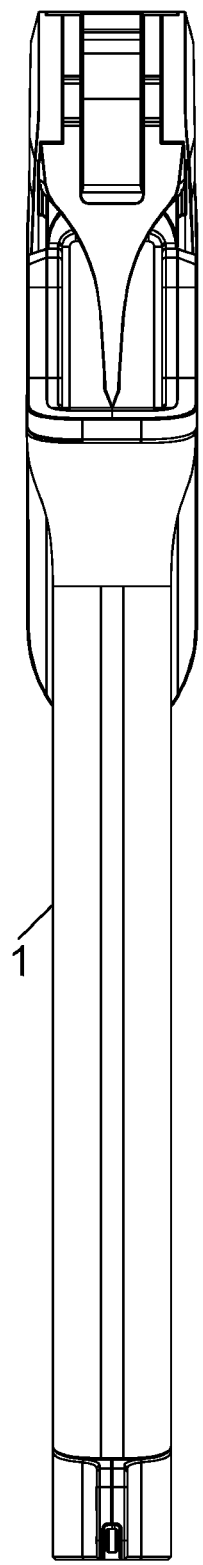
Figure 17E:
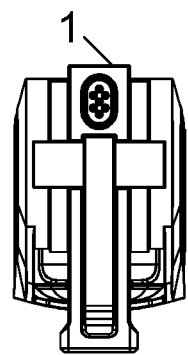
Figure 17F:
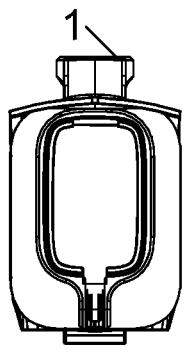

FIGS. 16A-16B are schematic illustrations of perspective views of the multi-purpose apparatus 1, demonstrating the shovel 3 in an open position at 180 degrees relative to the long dimension of the elongated handle 7, in accordance with some demonstrative embodiments of the present invention.

FIGS. 17A-17F are schematic illustrations of side-views of the multi-purpose apparatus 1 in a closed position, in accordance with some demonstrative embodiments of the present invention.

Figure 18A:
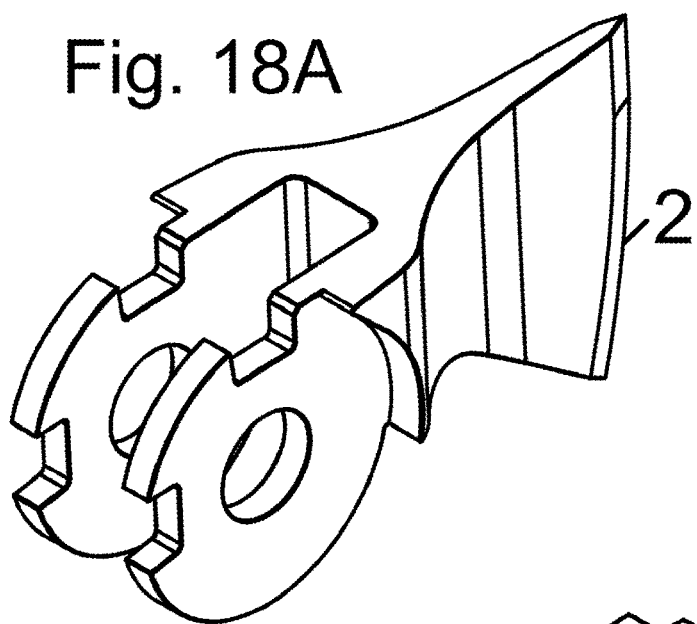
FIGS. 18A-18C are schematic illustrations of the axe (detached or dis-assembled from the multi-purpose apparatus), in accordance with some demonstrative embodiments of the present invention.
Figure 18B:
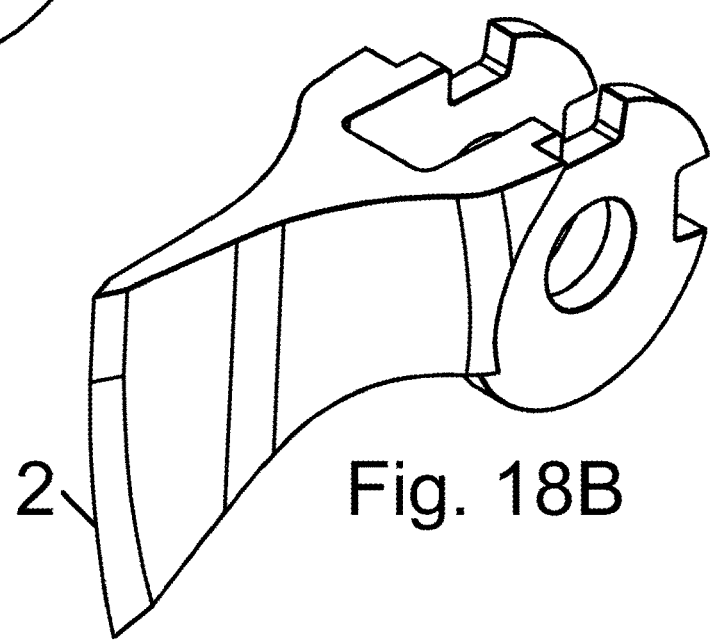
Figure 18C:
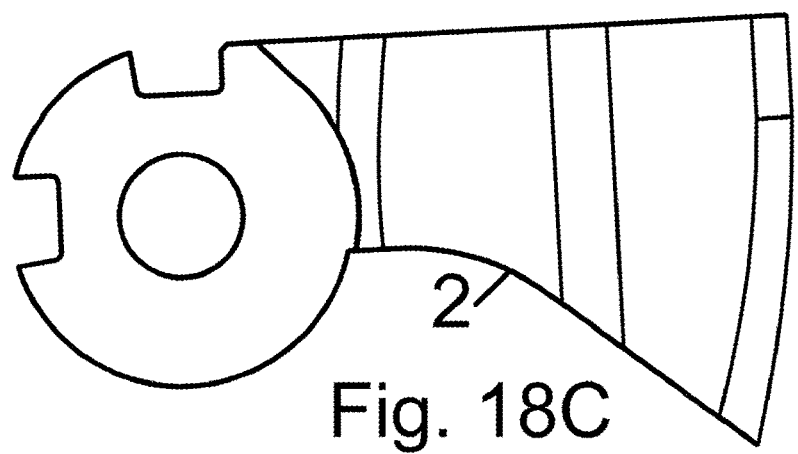
Figure 19A:
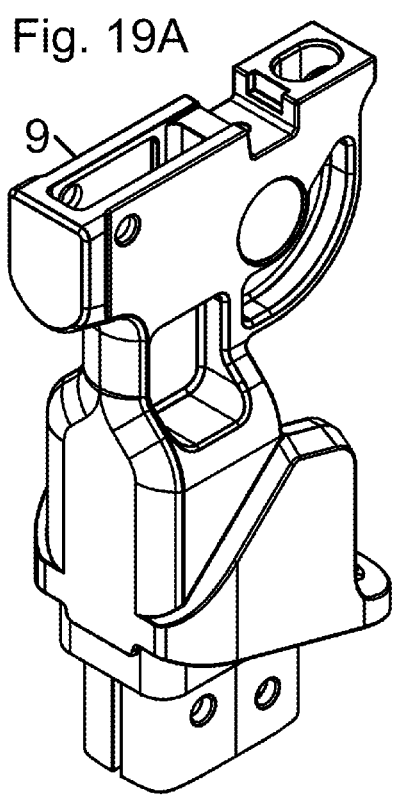
FIGS. 19A-19D are schematic illustrations of a head component of the multi-purpose apparatus, in accordance with some demonstrative embodiments of the present invention.
Figure 19B:
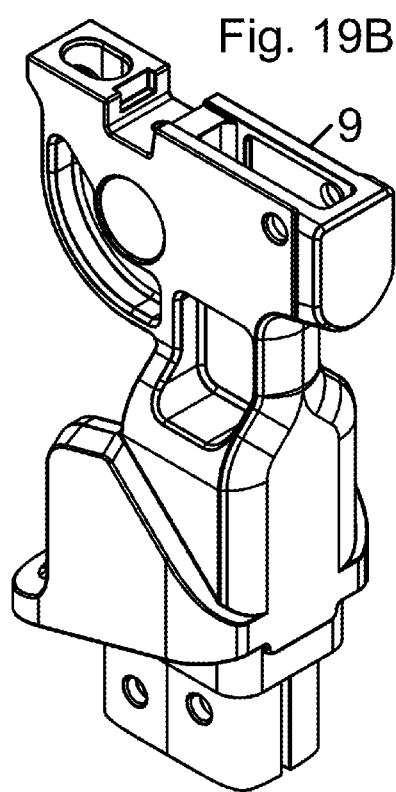
Figure 19C:
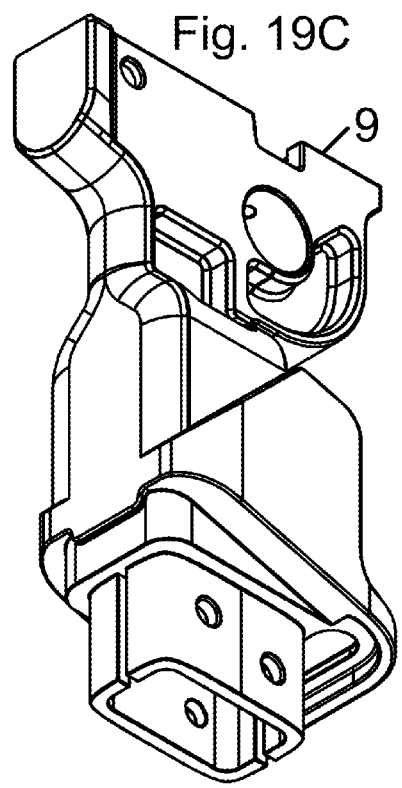
Figure 19D:
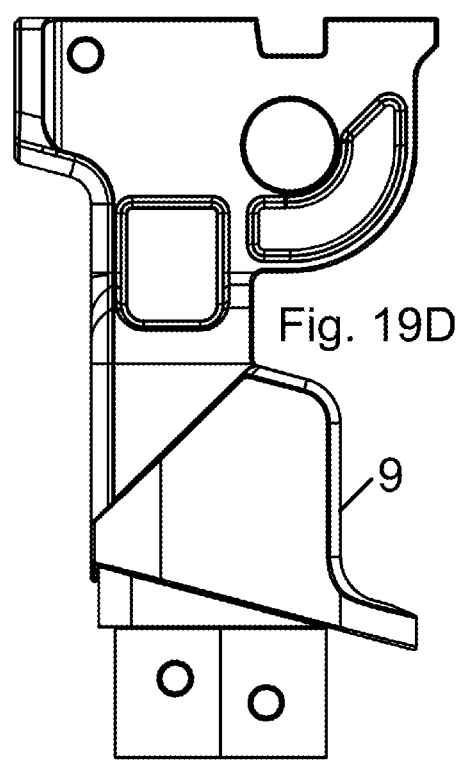
Figure 20A:
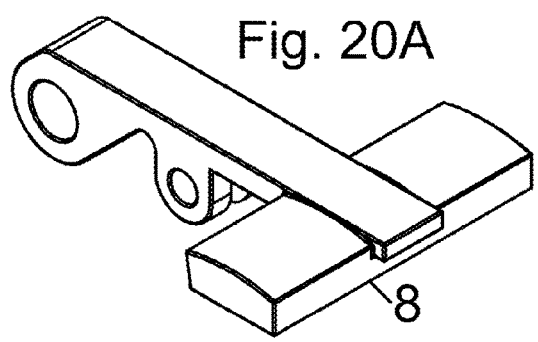
FIGS. 20A-20D are schematic illustrations of a lock component of the multi-purpose apparatus, in accordance with some demonstrative embodiments of the present invention.
Figure 20B:
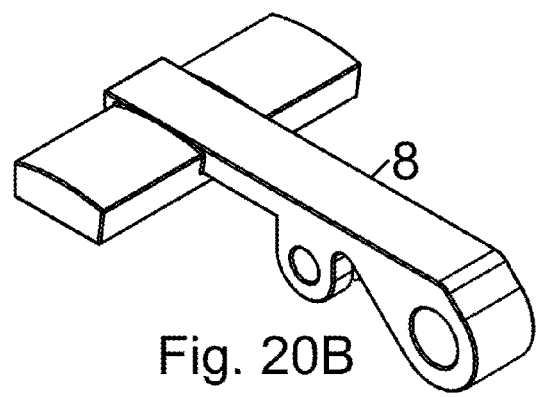
Figure 20C:
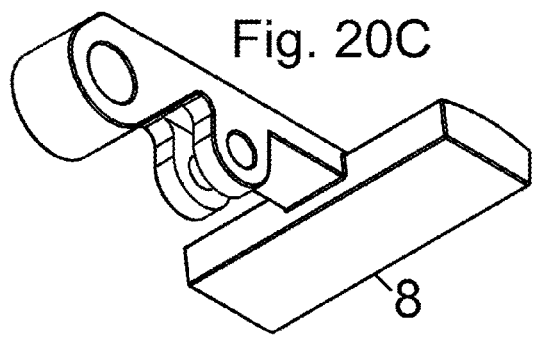
Figure 20D:
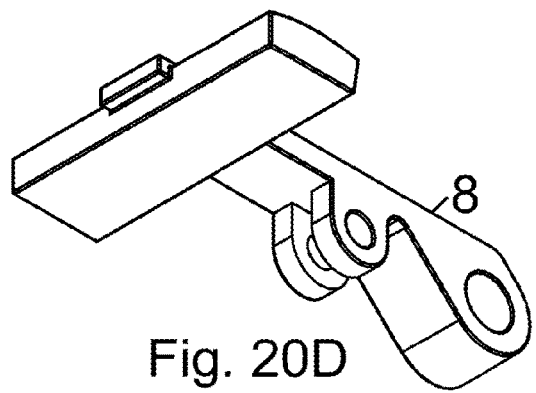
Figure 22A:
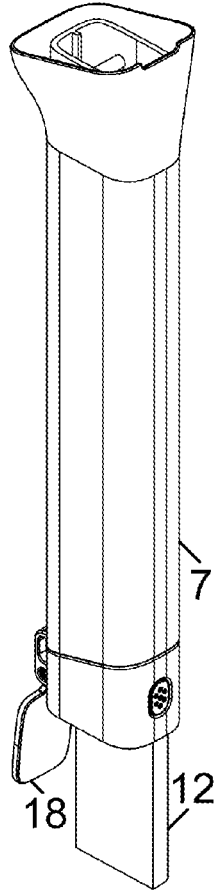
FIGS. 22A-22D are schematic illustrations of the elongated handle of the multi-purpose apparatus, in accordance with some demonstrative embodiments of the present invention.
Figure 22B:
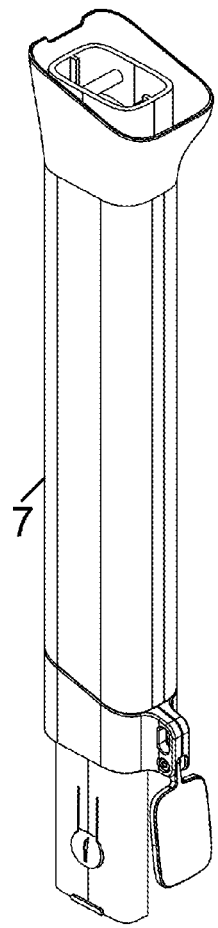
Figure 22C:
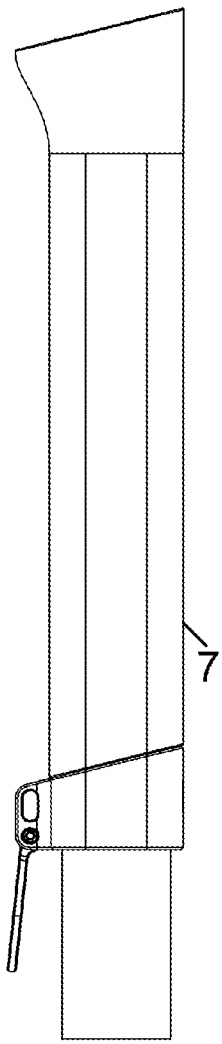
Figure 22D:
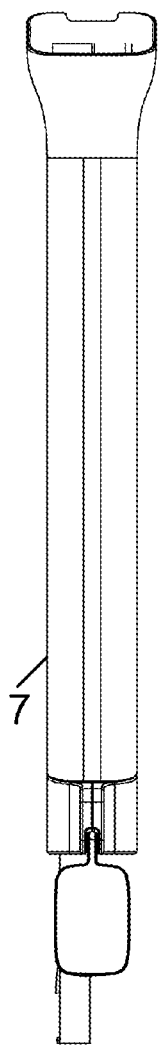
Figure 25A:
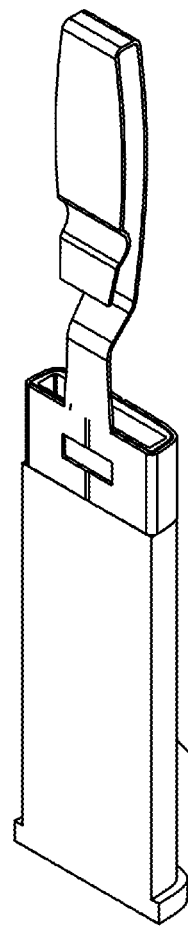
FIGS. 25A-25D are schematic illustrations of a sheath, in accordance with some demonstrative embodiments of the present invention.
Figure 25B:
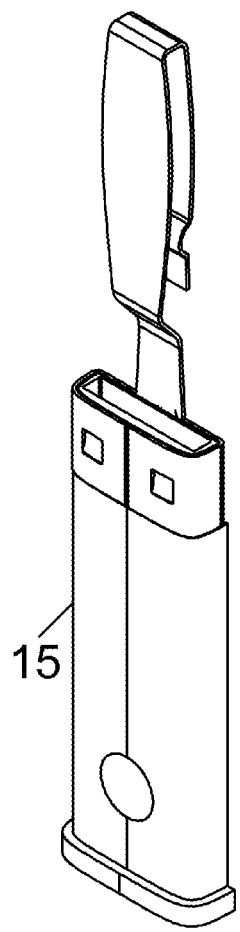
Figure 25C:
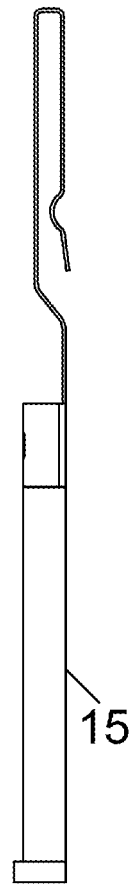
Figure 25D:
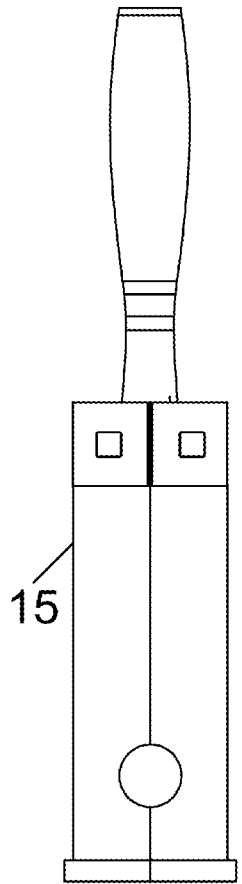

FIGS. 18A-18C are schematic illustrations of the axe 2 (e.g., detached or dis-assembled from the multi-purpose apparatus 1), in accordance with some demonstrative embodiments of the present invention. The axe 2 may have holes or apertures, or connecting elements, which may enable the axe to pivot by 90 degrees, from being in a first position (e.g., in which the cutting edge of the axe is hidden or covered), to being in a second position (e.g., in which the cutting edge of the axe is exposed, or is operational, or is facing outwardly). The axe 2 may be implemented as (or may be) a hatchet, a hatchet-head, an axe-head, or other suitable striking tool having a sharp blade which may be used, for example, to cut wood or to split wood or for similar purposes. Accordingly, the terms "axe" or "ax" as used herein, may include such hatchet or axe-head or other suitable striking tool.

In some embodiments, the axe 2 may be implemented as a single, monolithic, unit or element, which cannot be disassembled into smaller sub-units; thereby providing to such unit sufficient strength, endurance, dexterity and/or rigidity in order to allow such unit to remain intact while it is used for striking an object (e.g., wood). In other embodiments, optionally, the axe 2 may be implemented by using two or more sub-units or elements, which may be tightly or rigidly connected together or attached together or otherwise interconnected or secured to each other, while still providing the suitable strength, endurance, dexterity and/or rigidity to the axe 2.

FIGS. 18D-18F are schematic illustrations of exploded views of an axe 50 (e.g., detached or dis-assembled from the multi-purpose apparatus 1), in accordance with some demonstrative embodiments of the present invention. Axe 50 may be generally similar to axe 2 discussed above. However, while axe 2 may be a single, monolithic unit, axe 50 may be implemented as an assembly of two or more elements or sub-units. In a demonstrative example as shown, axe 50 may comprise an axe-blade 51 and an axe-base 52, which may be interconnected or otherwise attached to each other by using one or more connection mechanisms or attachment mechanism, such as by using a screw 53 or other suitable connection elements (e.g., bonding, gluing, screw with bonding, screw with gluing, male-female connection mechanism, screw with threading mechanism, or the like).

The implementation of axe 50 as an assembly of multiple sub-units may have various advantages or benefits. In a demonstrative embodiment, this may enable efficient and/or easier sharpening of the axe-blade 51. Additionally or alternatively, the axe-base 52 may have a suitable contour or structure such that it may split or separate or divide a wooden object (or other breakable object) into two or more pieces, while also protecting or hiding other units of the apparatus 1 (e.g., shovel 3) from getting in touch with such object or its pieces. Additionally or alternatively, the separation of axe 50 into two (or more) sub-units may enable to manufacture the two (or more) sub-units from two (or more) different materials, having different characteristics or functions: for example, the axe-base 52 may be formed of Titanium in order to be lightweight yet rigid, whereas the axe-blade 51 may be forged or steeled or formed as a stainless steel which may be strengthened and hardened in order to remain sharp for a long period of time.

Even though other suitable material(s) may be used, it is noted that the Applicants have realized that the unique assembly of the axe 50 from two interconnected units, and the unique selection of Titanium for the axe-base 52 and stainless steel for the axe-blade 51, may provide a unique and non-trivial features combination of rigidity and endurance, as well as enabling the axe 50 to be lightweight and to remain sharp over time.

FIGS. 19A-19D are schematic illustrations of a head component 9 of the multi-purpose apparatus 1, in accordance with some demonstrative embodiments of the present invention. The head component 9 may be connected or attached to a top side of the elongated handle 7. The head component 9 may hold in place one or more tools of the multi-purpose apparatus 1, such as the axe 2 and/or the shovel 3. The head component 9 may integrally comprise or may monolithically comprise one or more tools, such as the hammer-head 4. Optionally, the head component 9 may comprise, or may be connected to, hinges and/or axis components and/or pivoting elements, which may enable selective folding and unfolding (or insertion and extraction; or collapsing and un-collapsing; or exposing and hiding) of one or more of the tools of the multi-tool apparatus 1. Optionally, the pivoting may be gradual or may utilize stoppers to enable full extension (e.g., of the axe 2), full extension (e.g., holding the shovel 3 at 180 degrees relative to the elongated handle 7), partial extension (e.g., holding the shovel 3 at 90 degrees relative to the elongated handle 7), or the like. The head component 9 may comprise hinges or axis or connectors that may allow the axe 2 and/or the shovel 3, to selectively pivot by 90 degrees or by 180 degrees, or to selectively be exposed and operational (or, hidden or covered and non-operational); or to pivot between being stored securely, to being exposed outwardly and operational.

FIGS. 20A-20D are schematic illustrations of a lock component 8 of the multi-purpose apparatus 1, in accordance with some demonstrative embodiments of the present invention. The lock component 8 may operate, optionally in conjunction with the head assembly 9, in order to selectively fold and/or unfold one or more of the tools, and/or in order to hold in place or otherwise secure one or more of the tools of the multi-purpose apparatus 1.

FIGS. 21A-21B are schematic illustrations of the shovel 3 (e.g., detached or dis-assembled from the multi-purpose apparatus 1), in accordance with some demonstrative embodiments of the present invention. The shovel 3 may have holes or apertures, or connecting elements, which may enable the shovel 3 to pivot by 90 degrees, from being in a first position (e.g., in which the digging edge of the shovel 3 is hidden or covered), to being in a second position (e.g., in which the cutting edge of the shovel 3 is exposed, or is operational, or is facing outwardly); and optionally, to even pivot by an entire 180 degrees, or by an additional 90 degrees, such that the shovel 3 may be at 180 degrees angle relative to its original stored or secured position, now facing outwardly and away from the top-side of the elongated handle 7. Accordingly, the shovel 3 may have three positions: a zero degree position of being stored securely; a 90 degree position of being exposed perpendicularly to the elongated handle 7; and a 180 degree position of being exposed parallel to (or as an extension to) the elongated handle 7.

FIGS. 22A-22D are schematic illustrations of the elongated handle 7 of the multi-purpose apparatus 1, in accordance with some demonstrative embodiments of the present invention. The elongated handle 7 may be hollow or partially-hollow and may comprise an elongated cavity which may store or hold therein one or more items, such as an insert 12; a cover 18 may be operated by the user to close or open the cavity.

FIG. 23A is a schematic illustration of a saw 13 in an open position, in accordance with some demonstrative embodiments of the present invention. FIG. 23B is a schematic illustration of saw 13 in a closed or folded position, in accordance with some demonstrative embodiments of the present invention. Saw 13 may be inserted into (and extracted from) the cavity of the elongated handle 7. Optionally, saw 13 may be connected or attached or secured to the elongated handle 7, and/or an external surface or edge or point of the multi-purpose apparatus 1, in order to provide an improved or extended grip on saw 13, and/or in order to enable the user to reach with the saw 13 towards a remote target (e.g., to cut a high branch of a tree).

FIGS. 24A-24C are schematic illustrations of a knife 14, in accordance with some demonstrative embodiments of the present invention. Knife 14 may be inserted into (and extracted from) the cavity of the elongated handle 7. Optionally, knife 14 may be connected or attached or secured to the elongated handle 7, and/or an external surface or edge or point of the multi-purpose apparatus 1, in order to provide an improved or extended grip on knife 14, and/or in order to enable the user to reach with the knife 14 towards a remote target.

FIGS. 25A-25D are schematic illustrations of a sheath 15, in accordance with some demonstrative embodiments of the present invention. Sheath 15 (or other or similar blade-protector or blade-cover, or knife-protector or knife-cover) may be inserted into (and extracted from) the cavity of the elongated handle 7. Sheath 15 may hold or secure the knife 14, or other suitable blade or saw or sharp item. Optionally, Sheath 15 may operate to both (i) hold therein the knife 14, and (ii) be connected to or be held by the folded saw 13. Other suitable arrangements may be used.

Figure 26A:
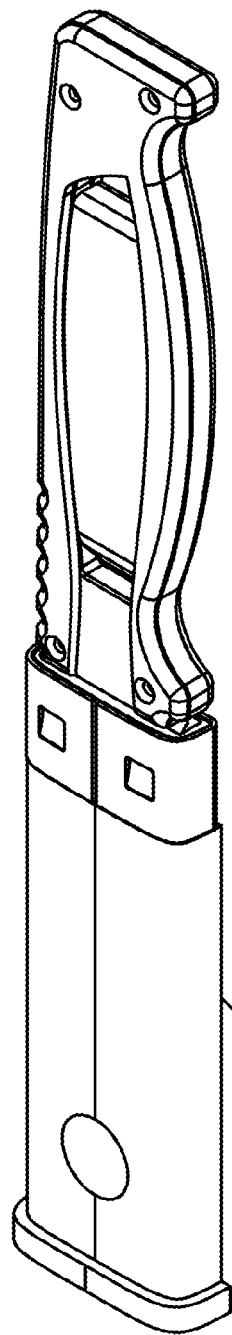
FIGS. 26A-26C are schematic illustrations of an insert, which is a combination of the sheath holding the knife, in accordance with some demonstrative embodiments of the present invention.
Figure 26B:
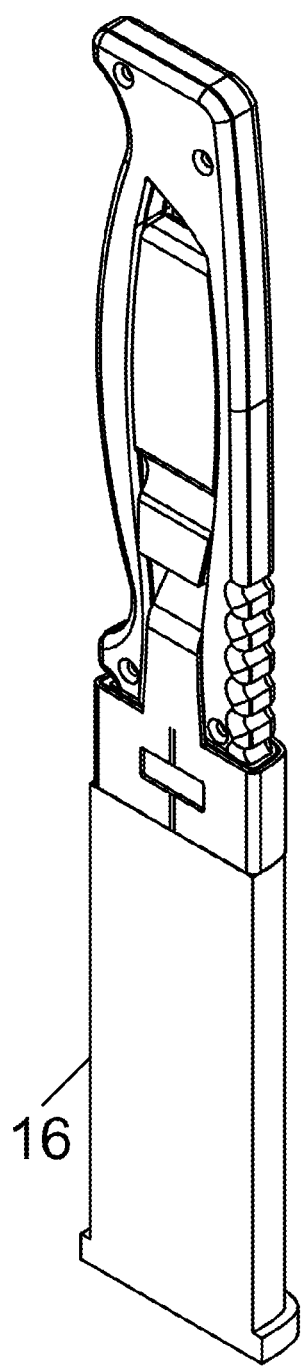
Figure 26C:
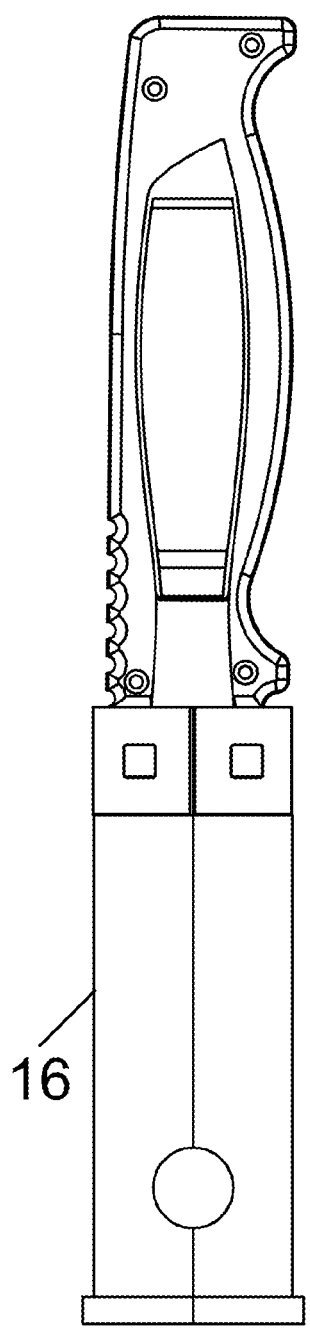

FIGS. 26A-26C are schematic illustrations of an insert 16, which may be a combination of sheath 15 holding therein knife 14, in accordance with some demonstrative embodiments of the present invention. Insert 16 may be inserted into (and extracted from) the cavity of the elongated handle 7.

Figure 27A:
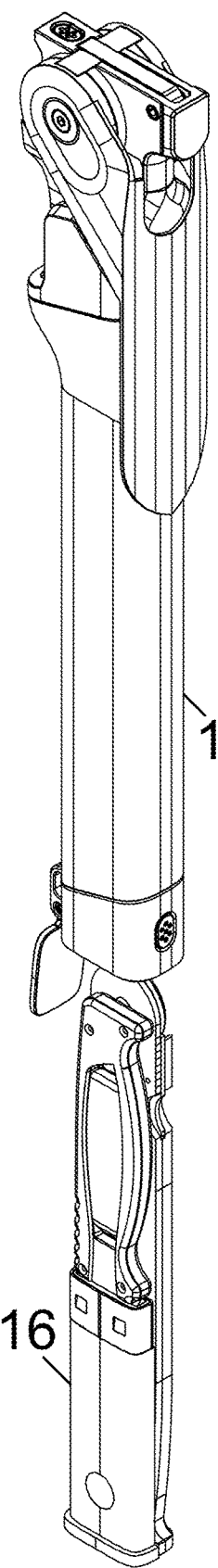
FIGS. 27A-27B are schematic illustrations of the multi-purpose apparatus, demonstrating also the insert and the saw extracted from the elongated handle, in accordance with some demonstrative embodiments of the present invention.
Figure 27B:
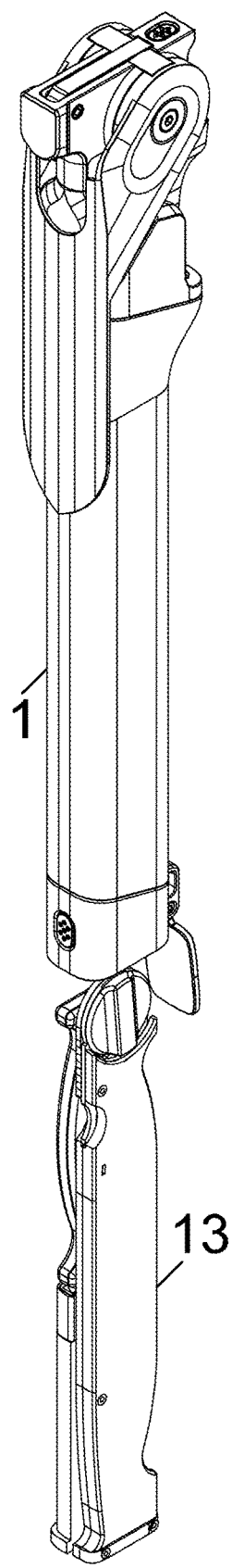

FIGS. 27A-27B are schematic illustrations of the multi-purpose apparatus 1, demonstrating also the insert 16 and the saw 13 extracted from the elongated handle 7, in accordance with some demonstrative embodiments of the present invention.

Figure 28A:
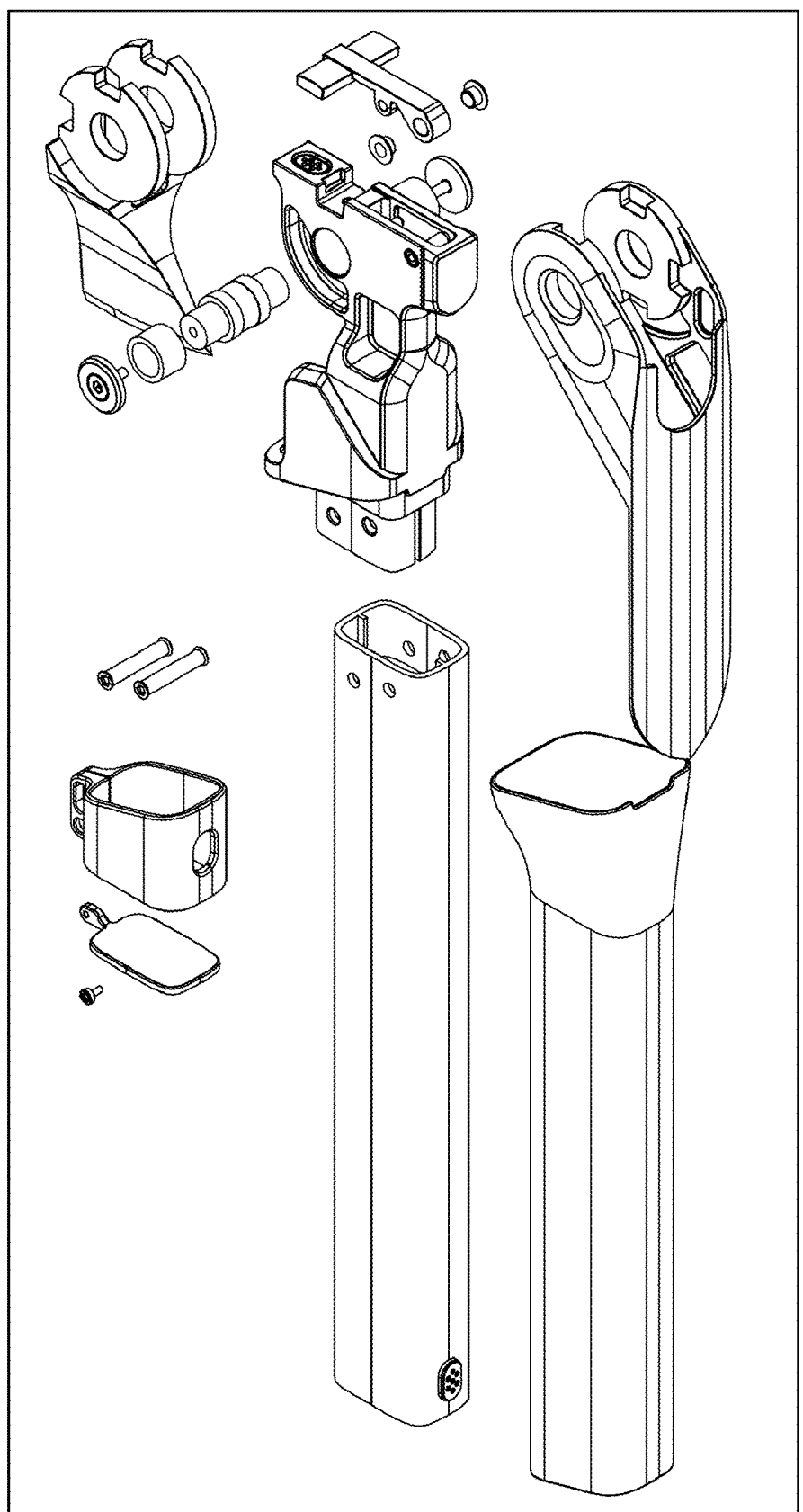
FIG. 28A is a schematic illustration of a perspective view of a kit of components, which may be utilized in order to assemble or construct the multi-purpose apparatus, in accordance with some demonstrative embodiments of the present invention.

FIG. 28A is a schematic illustration of a perspective view of a kit 17 of components, which may be utilized in order to assemble or construct the multi-purpose apparatus 1, in accordance with some demonstrative embodiments of the present invention.

Figure 28B:
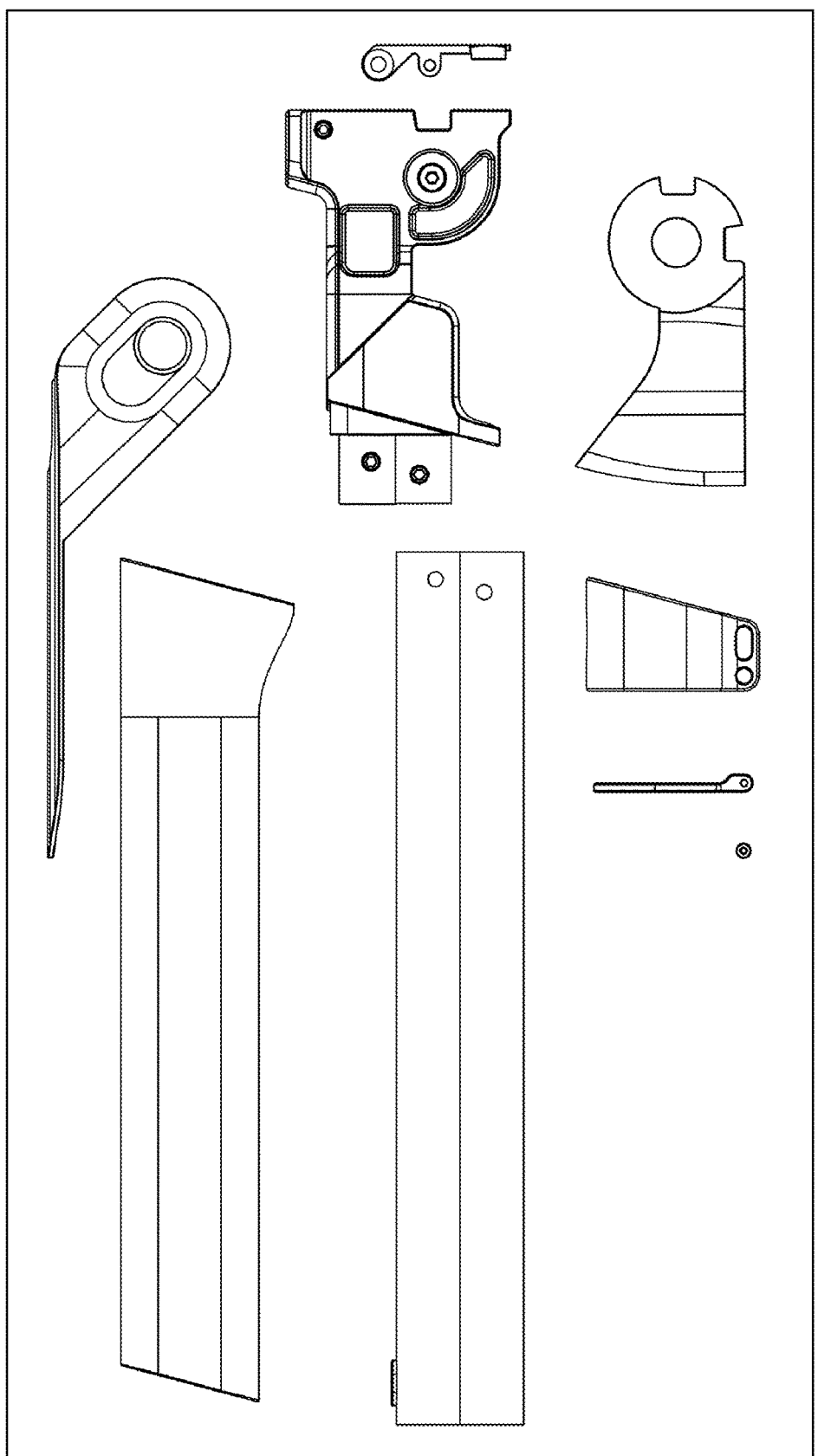
FIG. 28B is a schematic illustration of a side view of the kit of components, which may be utilized in order to assemble or construct the multi-purpose apparatus, in accordance with some demonstrative embodiments of the present invention.
Figure 29C:
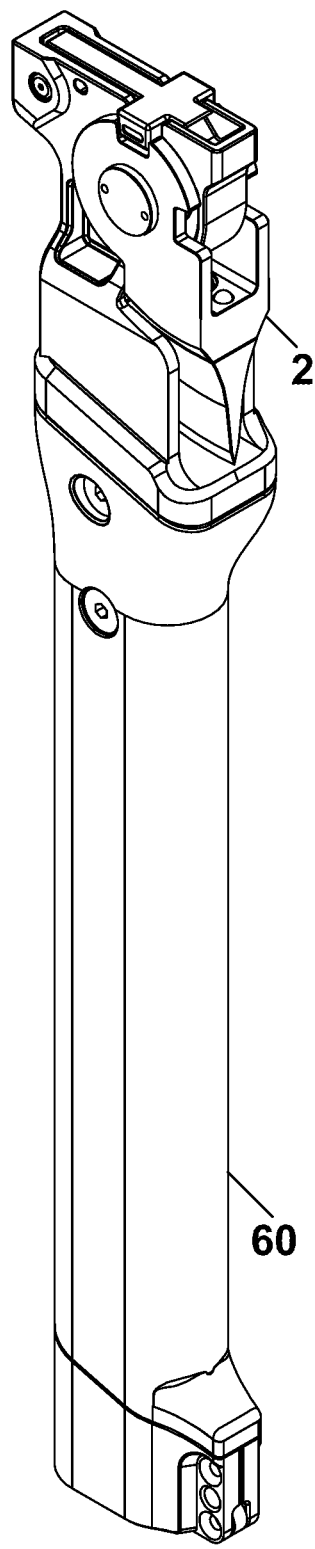
Figure 29D:
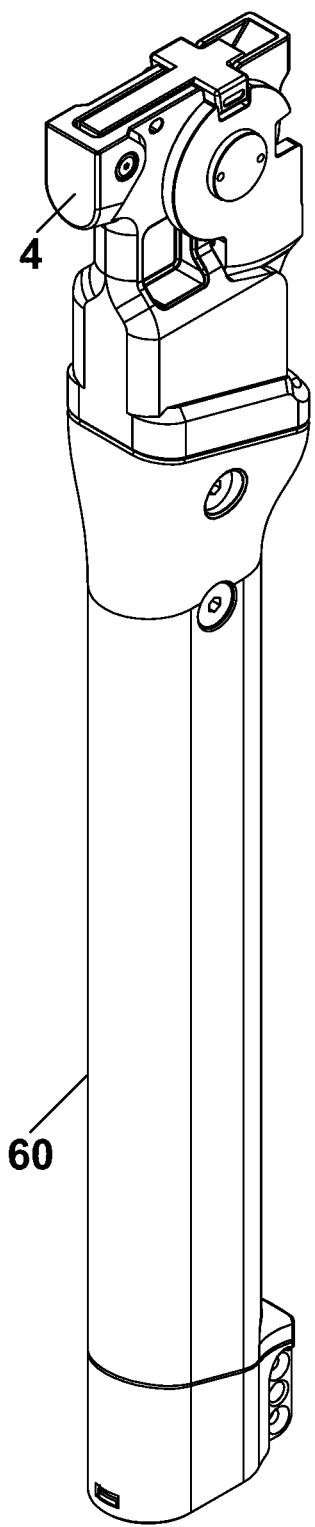
Figure 29G:
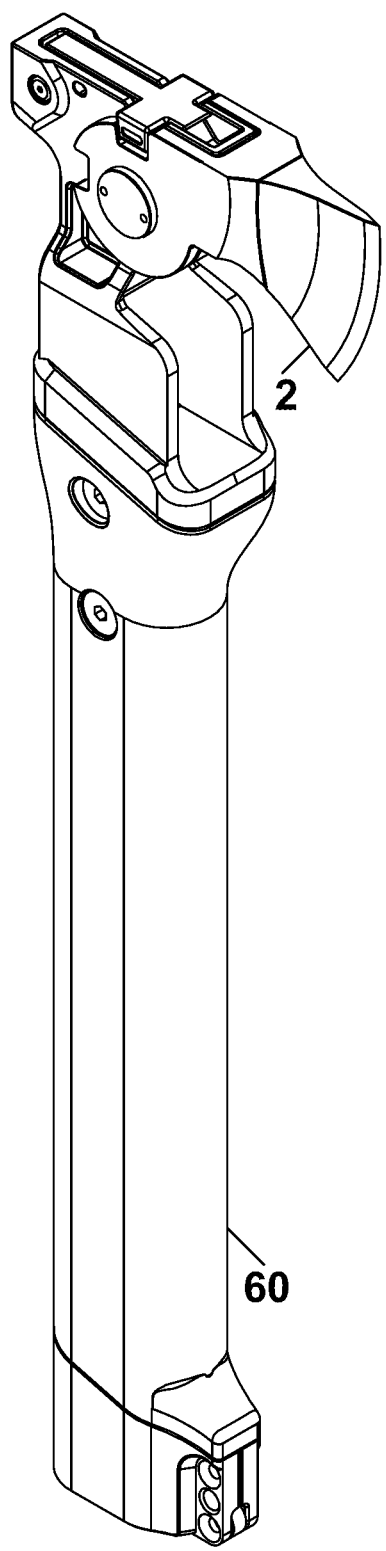
Figure 29H:
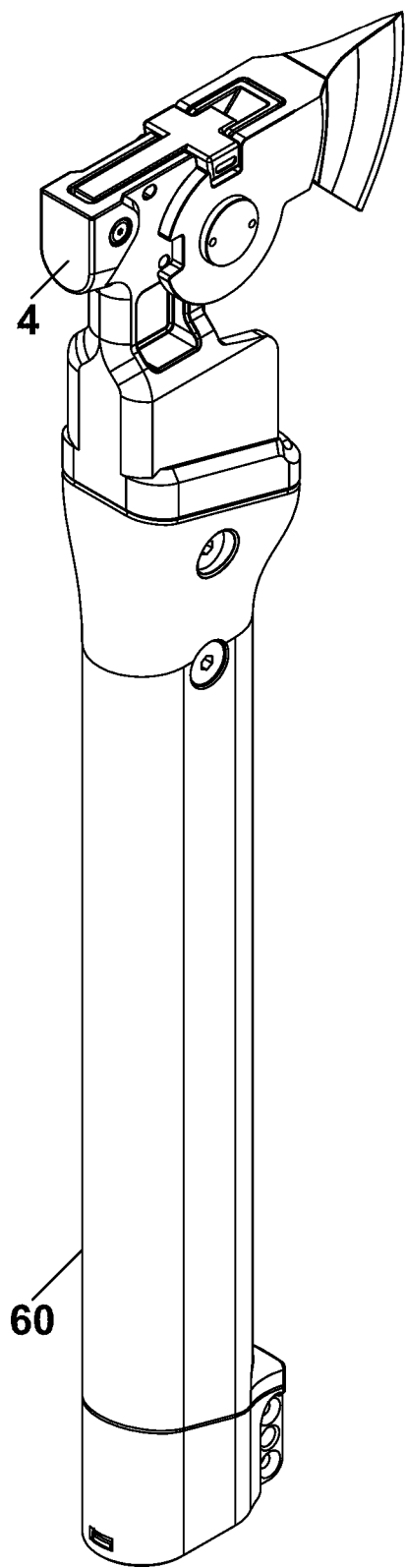

FIG. 28B is a schematic illustration of a side view of the kit 17 of components, which may be utilized in order to assemble or construct the multi-purpose apparatus 1, in accordance with some demonstrative embodiments of the present invention.

In a demonstrative embodiment, a central member is an elongated member having an elongated cavity. The top side of the central member may have a top-side assembly element, which may mount and/or store multiple upper-area units, for example, an axe (or ax), a shovel (or spade), and a hammer (or hammer head). These three units may be mounted on, or attached to, the top-side assembly element, which may allow each one of these three units to pivot or to rotate or to spin, in a selective and/or controlled manner, and to stop at one or more particular pivot points; for example, using an axis, hinges, stoppers, or other pivoting mechanism(s). This may allow, for example, folding and unfolding of the axe unit; folding and unfolding of the hammer unit; and folding and unfolding of the shovel unit between two positions (e.g., folded and unfolded) or among multiple positions (e.g., folded; unfolded at 90 degrees relative to the central member; unfolded at 180 degrees relative to the central member; unfolded at 45 or 135 or 225 or 270 degrees relative to the central member; unfolded at other angle or slanting relative to the central member).

The cavity inside the central member may be hollow and may store, and may hold in place, one or more additional tools or units, which may be referred to as "internal units" or a "magazine", and may be extracted or pulled-out or spilled-out from within the cavity. For example, the bottom-side of the central member may have a door or a cover, which may be taken apart and put back, or which may pivot by using an axis or hinge, thereby allowing the user to access the content stored within the cavity. The cover may optionally comprise a locking mechanism, or other safety feature, to prevent non-desired or unintentional opening of the cover or unintentional spillage of the content of the cavity.

In a demonstrative embodiment, the internal units stored within the cavity, may be or may comprise: a saw; a knife; and optionally a sheath or cover for the knife; and optionally a sheath or cover for the saw. It is noted that these are only some demonstrative and non-limiting examples to internal tools which may be stored within the central member or the magazine; and other suitable tools or accessories may be stored therein.

In some embodiments, the tool may enable the user to utilize each one of the five units (or other number of units), at the same level of quality of an independent unit or discrete unit. The multiple units or some of them may be connected to (or stored within) the same and the single central member, which may operate in a multi-purpose manner as a carrying handle for the tool, as a working handle for utilizing each unit, and as a storage unit to store the internal units.

It is noted that no conventional tool has both a saw and a knife stored together within the same central cavity or within the same handle of the tool. In some embodiments, the saw may be a full, standard-size saw having a blade length of 6 or 8 or 10 or 12 or 15 inches, or of at least 6 or 8 or 8 or 10 or 12 or 15, inches, optionally being a replaceable blade. It is clarified that these are only non-limiting examples, and other suitable sizes or dimensions may be used.

It is noted that no conventional tool has a saw and a knife and a sheath (e.g., for protecting the knife and/or for carrying the knife on the body once the knife is extracted from the cavity) that are all stored together within the same central cavity or within the same handle of the tool.

The tool of the present invention may be lightweight, for example, by utilizing one or more materials that are strong and rigid yet lightweight (e.g., titanium, aluminum, steel), and may have a small or reduced form-factor or footprint.

In some embodiments, the external units or the upper-side units, such as the axe and the shovel and the hammer-head, are particularly arranged or mounted or assembled relative to the upper-side assembly element and/or relative to the elongated central member, in a way that enables the central member to operate as a working handle for utilizing each one of them; and in a way that enables each one of these three units to operate independently and without being obstructed, partially or entirely or at all, by the location or the existence of the other external units; for example, such that the axe may be fully operational without being hindered or obstructed or blocked by the shovel unit which is located nearby or behind it.

The upper-side assembly element may optionally comprise a locking mechanism which may lock in place, in the alternate, either the axe in an open state, or the shovel in an open state (or both of them in a folded or closed state). The locking mechanism may alternately lock the axe or the shovel, and the upper-side region of the tool is suitable for operating under the pressure and forces that are expected from each discrete unit on its own. The locking mechanism may further enable the locking into place of units that are not in use, in order to secure them and to avoid their detachment or their becoming loose; and further enables the locking into place of a unit that is being used, in order to provide the rigidity or rigidness or sturdiness that are required for the efficient and safe operation of each such unit.

In some embodiments, the cover of the central member may be secured or held in place via a safety-catch or safety-pin or other securing mechanism that prevents accidental or unintentional opening of the central member during the actual usage of the multi-purpose tool; for example, securely preventing non-desired opening of the central member when a user utilizes the tool as an axe or as a hammer or as a shovel or spade. In some embodiments, the safety-catch or other securing mechanism of the bottom-side cover of the central member, may be held in place manually or automatically once the multi-purpose tool is unfolded and/or utilized in conjunction with one of the upper-side units (e.g., axe, hammer, shovel or spade).

In some embodiments, the tool may be structured in a manner that spreads or distributes weight generally evenly across multiple regions of the tool; and/or in a manner that causes the center of gravity of the tool to enable safe and efficient operation of each unit when that unit is in an open (or unfolded) position.

In some embodiments, the axe may have its own locking/unlocking mechanism relative to the upper-side assembly member, and the shovel may have its own, different, locking/unlocking mechanism relative to the upper-side assembly member. In other embodiments, a single locking member (e.g., "back lock") in the upper-side assembly member, may secure, or may lock/unlock in the alternate, both the axe and the shovel; thereby reducing the weight and/or the form factor of the tool, and also reducing the number of parts or components of the tool (e.g., reducing manufacturing costs).

In some embodiments, the axe unit or the axe head may be uniquely structured in a manner that has a shorter blade that is relatively thick, thereby enabling efficient operation of the axe (e.g., when cutting down a tree or a branch), while also providing protection to the shovel unit. This may be in contrast with a convention axe unit, which is thinner and suffers from the boundaries of a "frame" which tends to get stuck within a tree or branch during actual operation. The shorter length of the blade of the frame may further enable a shorter or smaller axe-cavity or axe-holding cavity in the tool, thereby enabling also reduction in the size, form-factor, footprint and/or weight of the tool.

In some embodiments, the unique structure of the axe may be a continuous configuration relative to the shovel or the two arms (or arm elements) at the base of the shovel unit, thereby allowing the user to operate the axe unit in order to break or cut wood without causing damage or friction to other parts of the tool and particularly to the shovel unit which is located nearby.

In some embodiments, the internal units (e.g., knife, sheath, saw) may be inserted into the elongated hollow cavity of the central member, and may be pulled or spilled outwardly from it, by utilizing a cover which can be securely opened or closed; without the need to push or pull such internal unit(s) through a slit or a partial aperture. This may enable increased flexibility and efficiency in insertion of units, extraction of units, replacing a first unit with a second unit, and/or performing such tasks while the tool is being carried or while the user is walking or running.

FIGS. 29A-29D are schematic illustrations of a multi-purpose device 60, shown in a closed axe position, in accordance with some demonstrative embodiments of the present invention.

FIGS. 29E-29H are schematic illustrations of a multi-purpose device 60, shown in an open axe position, in accordance with some demonstrative embodiments of the present invention.

Multi-purpose device 60 may be a lightweight version, or a reduced-features version, of multi-purpose apparatus 1 discussed above. For example, multi-purpose device 60 may comprise an elongated handle having an elongated cavity (e.g., for storing one or more inserts or tools therein), and a folding axe (e.g., similar to axe 2 or axe 50 discussed above), as well as hammer-head (e.g., similar to hammer-head 4 discussed above). Multi-purpose device 60 may not comprise any shovel unit or spade unit, in order to reduce the form factor and/or the weight of multi-purpose device, while still providing a useful multi-purpose tool.

In some embodiments of the present invention, regions and/or portions and/or elements and/or components may have various scales and/or ratios and/or dimensions and/or sizes, such that the elements shown in the figures are not necessarily drawn to scale, and are not intended to limit the present invention. The present invention comprises and includes any combination of parameters and/or features that is disclosed in the text and/or is shown in any of the drawings, including the particular values and/or sizes and/or ratios that are disclosed in the text, and including the particular ratios and/or scales that are actually shown in the figures, and including any other suitable value that is disclosed in this text and/or in any of the drawings. However, in some embodiments of the present invention, the articles or components shown in the drawings have the exact scale or ratio that is shown in the drawing(s) and which may be relied upon; such that the present invention does indeed comprise, among various other implementations and embodiments, also and/or at least the exact scale(s) and/or exact ratio(s) among components or dimensions as shown in the drawings.

The applicants have realized that in some embodiments of the present invention, the exact or the particular dimensions, ratios, scales and/or properties that are discussed herein and/or are shown in any of the drawings, are novel and may provide unique advantages with regard to convenience and/or efficiency, rigidness or rigidity, efficient utilization or operation, small or smaller or reduced weight, small or reduced form-factor or footprint, improved or better grip or handling or carrying, reduced strain on the user, and/or other functional advantageous that are not merely obvious design preferences and are not merely obvious ornamental preferences.

In some embodiments, an apparatus comprises: an elongated handle, having an elongated cavity therein; a cover connected at a lower side of the elongated handle, to selectively allow access or block access one or more items stored within to said elongated cavity of the elongated handle; a head assembly connected at an upper side of the elongated handle; wherein the head assembly is connected to a plurality of different mechanical tools which comprise: a first mechanical tool that is foldable between a first position and a second position, wherein in the first position the first mechanical tool is generally perpendicular to the longest dimension of the elongated handle, wherein in the second position the first mechanical tool is generally parallel to the longest dimension of the elongated handle; a second mechanical tool.

In some embodiments, the head assembly is a monolithic unit that integrally and monolithically comprises a third mechanical tool.

In some embodiments, the head assembly is a monolithic unit that integrally and monolithically comprises a hammer head.

In some embodiments, the first mechanical tool is an axe.

In some embodiments, the first mechanical tool is an axe having at least (i) a cutting edge, and (ii) a non-cutting edge that is generally perpendicular to the cutting edge; wherein the axe is foldable between: (I) a first position, in which the cutting edge of the axe is exposed and is facing outwardly and away from the head assembly and away from the elongated member, and in which the non-cutting edge of the axe is generally perpendicular to the longest dimension of the elongated member, and (II) a second position in which the cutting edge of the axe is unexposed and is facing downwardly towards the lower side of the elongated handle.

In some embodiments, the first mechanical tool is an axe having at least (i) a cutting edge, and (ii) a non-cutting edge that is generally perpendicular to the cutting edge; wherein the axe is foldable between: (I) a first position, in which the cutting edge of the axe is exposed and is facing outwardly and away from the head assembly and away from the elongated member, and in which the non-cutting edge of the axe is generally perpendicular to the longest dimension of the elongated member, and (II) a second position in which the cutting edge of the axe is unexposed and is facing downwardly towards the lower side of the elongated handle, and in which the cutting edge of the axe is hidden within a complementing cavity of the head assembly.

In some embodiments, the first mechanical tool is an axe having at least (i) a cutting edge, and (ii) a non-cutting edge that is generally perpendicular to the cutting edge; wherein the axe is foldable between: (I) a first position, in which the cutting edge of the axe is exposed and is facing outwardly and away from the head assembly and away from the elongated member, and in which the non-cutting edge of the axe is generally perpendicular to the longest dimension of the elongated member, and (II) a second position in which the cutting edge of the axe is unexposed and is facing downwardly towards the lower side of the elongated handle, and in which the cutting edge of the axe is hidden within a complementing cavity located at the top side of the elongated handle.

In some embodiments, the second mechanical tool is a shovel.

In some embodiments, the second mechanical tool is a shovel having at least (i) a digging edge, and (ii) a long shovel dimension that is generally perpendicular to the digging edge of the shovel; wherein the shovel is selectively foldable among three positions which comprise: (I) a first shovel position, in which the cutting edge of the shovel is facing downwardly towards the lower side of the elongated handle, and in which the long shovel dimension is generally parallel to the longest dimension of the elongated handle, and (II) a second shovel position, in which the cutting edge of the shovel is facing outwardly away from the elongated handle, and in which the long shovel dimension is generally perpendicular to the longest dimension of the elongated handle, and (III) a third shovel position, in which the cutting edge of the shovel is facing upwardly and away from the top side of the elongated handle, and in which the long shovel dimension is generally parallel to the longest dimension of the elongated handle.

In some embodiments, the second mechanical tool is a spade.

In some embodiments, the second mechanical tool is a spade that is selectively foldable among three spade positions; wherein in a first spade position the spade is at an angle of 90 degrees relative to the elongated handle; wherein in a second spade position the spade is at an angle of 180 degrees relative to the elongated handle; wherein in a third spade position the spade is at an angle of 0 degrees relative to the elongated handle.

In some embodiments, the first mechanical tool is a shovel.

In some embodiments, the first mechanical tool is a shovel having at least (i) a digging edge, and (ii) a long shovel dimension that is generally perpendicular to the digging edge of the shovel; wherein the shovel is selectively foldable among at least two positions which comprise: (I) a first shovel position, in which the cutting edge of the shovel is facing downwardly towards the lower side of the elongated handle, and in which the long shovel dimension is generally parallel to the longest dimension of the elongated handle, and (II) a second shovel position, in which the cutting edge of the shovel is facing outwardly away from the elongated handle, and in which the long shovel dimension is generally perpendicular to the longest dimension of the elongated handle.

In some embodiments, the first mechanical tool is a spade.

In some embodiments, the first mechanical tool is a foldable axe; and the second mechanical tool is a foldable shovel.

In some embodiments, the first mechanical tool is a foldable axe; and the second mechanical tool is a foldable spade.

In some embodiments, the first mechanical tool is a foldable axe that is selectively foldable between: (I) a first axe position in which a cutting edge of the foldable axe is exposed and is facing outwardly, and (II) a second axe position in which the cutting edge of the axe is non-exposed; and the second mechanical tool is a foldable shovel that is selectively foldable between: (i) a first shovel position in which the foldable shovel is generally perpendicular to the longest dimension of the elongated handle, and (ii) a second shovel position in which the foldable shovel is generally parallel to the longest dimension of the elongated handle.

In some embodiments, the first mechanical tool is a foldable axe that is selectively foldable between: (I) a first axe position in which a cutting edge of the foldable axe is exposed and is facing outwardly, and (II) a second axe position in which the cutting edge of the axe is non-exposed; and the second mechanical tool is a foldable shovel that is selectively foldable between three shovel positions which comprise: (i) a first shovel position in which the foldable shovel is generally perpendicular to the longest dimension of the elongated handle, and (ii) a second shovel position in which the foldable shovel is generally parallel to the longest dimension of the elongated handle and in which a digging edge of the foldable shovel is facing outwardly and away relative to the elongated handle, and (iii) a third shovel position in which the foldable shovel is generally parallel to the longest dimension of the elongated handle and in which the digging edge of the foldable shovel is immediately adjacent to an external surface of the elongated handle.

In some embodiments, the first mechanical tool is a foldable axe that is selectively foldable between: (I) a first axe position in which a cutting edge of the foldable axe is exposed and is facing outwardly, and (II) a second axe position in which the cutting edge of the axe is non-exposed; and the second mechanical tool is a foldable spade that is selectively foldable between: (i) a first spade position in which the foldable spade is generally perpendicular to the longest dimension of the elongated handle, and (ii) a second spade position in which the foldable spade is generally parallel to the longest dimension of the elongated handle.

In some embodiments, the first mechanical tool is a foldable axe that is selectively foldable between: (I) a first axe position in which a cutting edge of the foldable axe is exposed and is facing outwardly, and (II) a second axe position in which the cutting edge of the axe is non-exposed; and the second mechanical tool is a foldable spade that is selectively foldable between three spade positions which comprise: (i) a first spade position in which the foldable spade is generally perpendicular to the longest dimension of the elongated handle, and (ii) a second spade position in which the foldable shovel is generally parallel to the longest dimension of the elongated handle and in which a digging edge of the foldable spade is facing outwardly and away relative to the elongated handle, and (iii) a third spade position in which the foldable spade is generally parallel to the longest dimension of the elongated handle and in which the digging edge of the foldable spade is immediately adjacent to an external surface of the elongated handle.

In some embodiments, the head assembly is a monolithic unit that integrally and monolithically comprises a hammer head; wherein the first mechanical tool is a folding axe; wherein the second mechanical tool is a folding shovel; wherein the elongated handle comprises a first external surface which is generally perpendicular to a second, opposite, external surface; wherein (I) the hammer head, and (II) the folding shovel, and (III) the first external surface of the elongated handle, are located at a first side of the apparatus; wherein (i) the folding axe, and (ii) the second external surface of the elongated handle, are located at a second side of the apparatus which is opposite to and is generally parallel to the first side of the apparatus.

In some embodiments, the head assembly is a monolithic unit that integrally and monolithically comprises a hammer head; wherein the first mechanical tool is a folding axe; wherein the second mechanical tool is a folding spade; wherein the elongated handle comprises a first external surface which is generally perpendicular to a second, opposite, external surface; wherein (I) the hammer head, and (II) the folding spade, and (III) the first external surface of the elongated handle, are located at a first side of the apparatus; wherein (i) the folding axe, and (ii) the second external surface of the elongated handle, are located at a second side of the apparatus which is opposite to and is generally parallel to the first side of the apparatus.

In some embodiments, the head assembly is a monolithic unit that integrally and monolithically comprises a hammer head; wherein the first mechanical tool is a folding axe; wherein the second mechanical tool is a folding shovel; wherein, when the folding shovel is in a fully folded position, an entirety of the folding shovel is closer to the elongated handle, relative to a hammering surface of the hammer head.

In some embodiments, the head assembly is a monolithic unit that integrally and monolithically comprises a hammer head; wherein the first mechanical tool is a folding axe; wherein the second mechanical tool is a folding shovel; wherein, when the folding shovel is in a fully folded position, an entirety of the folding shovel is non-protruding relative to a hammering surface of the hammer head.

In some embodiments, the head assembly is a monolithic unit that integrally and monolithically comprises a hammer head; wherein the first mechanical tool is a folding axe; wherein the second mechanical tool is a folding shovel; wherein the apparatus is generally L-shaped when concurrently (I) the folding axe is exposed, and (II) the folding shovel is folded, and (III) the hammer head is exposed.

In some embodiments, the second mechanical tool is a folding shovel which is selectively foldable between at least two shovel positions which comprise: (I) a first shovel position, in which the folding shovel is folded and is non-operable, and is located adjacently to a first external surface of the elongated handle, and (II) a second shovel position, in which the folding shovel is extended away from the top side of the elongated handle; wherein in the first shovel position, the digging edge of the folding shovel is located at a right side of the apparatus; wherein in the second shovel position, the digging edge of the folding shovel is located at a left side of the apparatus.

In some embodiments, the apparatus further comprises: a folding saw, stored within the elongated cavity of the elongated handle.

In some embodiments, the apparatus further comprises: a knife, stored within the elongated cavity of the elongated handle.

In some embodiments, the apparatus further comprises: a knife and a sheath, stored together within the elongated cavity of the elongated handle.

In some embodiments, the apparatus further comprises: a folding saw, and a knife and a sheath, which are stored together within the elongated cavity of the elongated handle.

In some embodiments, the apparatus further comprises: a knife, stored within the elongated cavity of the elongated handle; wherein an external surface of the apparatus comprises one or more gripping elements to securely hold said knife after said knife is removed from the elongated cavity.

In some embodiments, the first mechanical tool is an axe which comprises: (i) an axe-blade formed of a first material, and (ii) an axe-base formed of a second material, and (iii) a connection mechanism to securely connect the axe-blade with the axe-base.

In some embodiments, the first mechanical tool is an axe which comprises: (i) an axe-blade formed of stainless steel, and (ii) an axe-base formed of Titanium, and (iii) a connection mechanism to securely connect the axe-blade with the axe-base.

In some embodiments, the first mechanical tool is a folding axe which is able to be selectively pivoted between: (I) a closed position in which the longest dimension of the folding axe is generally parallel to the longest dimension of the elongated handle, and (II) an open position in which the longest dimension of the folding axe is generally perpendicular to the longest dimension of the elongated handle; wherein the second mechanical tool is a hammer-head which is monolithically integrated in said head assembly.

In some embodiments, the first mechanical tool is a folding axe which is able to be selectively pivoted between: (I) a closed position in which the longest dimension of the folding axe is generally parallel to the longest dimension of the elongated handle, and (II) an open position in which the longest dimension of the folding axe is generally perpendicular to the longest dimension of the elongated handle;

wherein the folding axe comprises: (i) an axe-blade formed of a first material, and (ii) an axe-base formed of a second material, and (iii) a connection mechanism to securely connect the axe-blade with the axe-base; wherein the second mechanical tool is a hammer-head which is monolithically integrated in said head assembly.

In some embodiments, the first mechanical tool is a folding axe which is able to be selectively pivoted between: (I) a closed position in which the longest dimension of the folding axe is generally parallel to the longest dimension of the elongated handle, and (II) an open position in which the longest dimension of the folding axe is generally perpendicular to the longest dimension of the elongated handle; wherein the folding axe comprises: (i) an axe-blade formed of stainless steel, and (ii) an axe-base formed of Titanium, and (iii) a connection mechanism to securely connect the axe-blade with the axe-base; wherein the second mechanical tool is a hammer-head which is monolithically integrated in said head assembly.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the claims are intended to cover all such modifications, substitutions, changes, and equivalents.

The invention claimed is:

1. An apparatus comprising:
   (a) an elongated handle, having an elongated cavity therein;
   (b) a cover connected at an opening to said cavity situated at a lower end of the elongated handle, to selectively allow access or block access to said elongated cavity of the elongated handle, and to selectively allow access or block access to one or more items stored and entirely concealed within said elongated cavity of the elongated handle;
   (c) a head assembly connected at an upper end of the elongated handle, wherein the head assembly is directly connected simultaneously to a plurality of different mechanical tools;
   (d) wherein a first side of the head assembly comprises a flat hammer-head, to enable a user to utilize the apparatus as a hammer;
   (e) a folding axe, that is connected at a second side of the head assembly that is opposite said first side;
      wherein the folding axe that is foldable between a first axe position and a second axe position,
      wherein in the first axe position the folding axe is generally perpendicular to the longest dimension of the elongated handle, and a cutting edge of the folding axe is exposed and is facing outwardly from the elongated handle and is operational,
      wherein in the second axe position the folding axe is generally parallel to the longest dimension of the elongated handle, and the cutting edge of the folding axe is unexposed and is non-operational and is facing downwardly towards the lower side of the elongated handle;
   (f) a folding shovel, that is connected at said first side of the head assembly and beneath said flat hammer-head, wherein the folding shovel is selectively foldable among a first shovel position and a second shovel position and a third shovel position,
      wherein in the first shovel position, the folding shovel is generally parallel to the longest dimension of the elongated handle and is completely folded and is not operational;
      wherein in the second shovel position, the folding shovel is generally perpendicular to the longest dimension of the elongated handle, and is operational;
      wherein in the third shovel position, the folding shovel is generally parallel to the longest dimension of the elongated handle and is completely unfolded and is operational;
   (g) wherein the elongated handle has said elongated cavity therein extending internally along the long axis of said elongated handle; wherein said elongated cavity completely conceals therein an entirety of an additional mechanical tool, that is completely removable and completely detachable from the apparatus, and that can also be mechanically connected to a mechanical connector of said apparatus; wherein said additional mechanical tool is additional to said hammer-head, to said folding axe, and to said folding shovel;
   (h) wherein, the folding axe in its axe position that is perpendicular to the elongated handle, is facing opposite direction to the folding shovel in its shovel position that is perpendicular to the elongated handle;
   (i) wherein the folding axe, in any of its axe positions, does not obstruct the folding shovel in any of its shovel positions;
      wherein the folding shovel, in any of its axe positions, does not obstruct the folding axe in any of its axe positions.

2. The apparatus of claim 1, wherein the head assembly is a monolithic unit that integrally and monolithically comprises said hammer-head.

3. The apparatus of claim 1, wherein in the second axe position, the cutting edge of the folding axe is hidden within a complementing cavity of the head assembly situated at an opposite side of said hammer head.

4. The apparatus of claim 1, wherein the folding shovel has at least (i) a digging edge, and (ii) a long shovel dimension that is generally perpendicular to the digging edge of the folding shovel; (I) wherein in the first shovel position, the cutting edge of the folding shovel is facing downwardly towards the lower edge of the elongated handle, and the long shovel dimension is generally parallel to the longest dimension of the elongated handle, (II) wherein in the second shovel position, the cutting edge of the folding shovel is facing outwardly away from the elongated handle, and the long shovel dimension is generally perpendicular to the longest dimension of the elongated handle, (III) wherein in the third shovel position, the cutting edge of the folding shovel is facing upwardly and away from the top side of the elongated handle, and the long shovel dimension is generally parallel to the longest dimension of the elongated handle.

5. The apparatus of claim 1, wherein the head assembly is a monolithic unit that integrally and monolithically comprises said hammer head;
   wherein (I) the hammer head, and (II) the folding shovel, are located at a first side of the elongated handle;
   wherein the folding axe is located at a second, opposite, side of the elongated handle.

6. The apparatus of claim 1,
wherein the head assembly is a monolithic unit that integrally and monolithically comprises said hammer head;
wherein, when the folding shovel is in a fully folded position, an entirety of the folding shovel is closer to the elongated handle, relative to a hammering surface of the hammer head to enable hammering that is unobstructed by the folding shovel.

7. The apparatus of claim 1,
wherein the head assembly is a monolithic unit that integrally and monolithically comprises said hammer head;
wherein, when the folding shovel is in a fully folded position, an entirety of the folding shovel is non-protruding relative to a hammering surface of the hammer head.

8. The apparatus of claim 1,
wherein the head assembly is a monolithic unit that integrally and monolithically comprises a hammer head;
wherein the apparatus is generally L-shaped when concurrently (I) the folding axe is exposed, and (II) the folding shovel is folded, and (III) the hammer head is exposed.

9. The apparatus of claim 1, further comprising:
a folding saw, stored within the elongated cavity of the elongated handle.

10. The apparatus of claim 1, further comprising:
a knife, stored within the elongated cavity of the elongated handle.

11. The apparatus of claim 1, further comprising:
a knife and a sheath, stored together within the elongated cavity of the elongated handle.

12. The apparatus of claim 1, further comprising:
a folding saw, and a knife and a sheath, which are stored together within the elongated cavity of the elongated handle.

13. The apparatus of claim 1, further comprising:
a knife, stored within the elongated cavity of the elongated handle;
wherein an external surface of the apparatus comprises one or more gripping elements to securely hold said knife after said knife is completely removed from the elongated cavity.

14. The apparatus of claim 1,
wherein the folding axe comprises: (i) an axe-blade formed of a first material, and (ii) an axe-base formed of a second material, and (iii) a connection mechanism to securely connect the axe-blade with the axe-base.

15. The apparatus of claim 1,
wherein the folding axe comprises: (i) an axe-blade formed of stainless steel, and (ii) an axe-base formed of Titanium, and (iii) a connection mechanism to securely connect the axe-blade with the axe-base.

* * * * *